(12) United States Patent
Phillips et al.

(10) Patent No.: US 9,372,479 B1
(45) Date of Patent: Jun. 21, 2016

(54) SYSTEM AND METHOD FOR A DATABASE LAYER FOR MANAGING A SET OF ENERGY CONSUMING DEVICES

(71) Applicant: Omniboard, Inc., South San Francisco, CA (US)

(72) Inventors: Stephen Louis Phillips, Gainesville, GA (US); Michael Bradley Martin, Edmond, OK (US); Andrew Manzo, Redwood City, CA (US)

(73) Assignee: Omniboard, Inc., South San Francisco, CA (US)

( * ) Notice: Subject to any disclaimer, the term of this patent is extended or adjusted under 35 U.S.C. 154(b) by 639 days.

(21) Appl. No.: 13/773,482

(22) Filed: Feb. 21, 2013

Related U.S. Application Data

(63) Continuation-in-part of application No. 13/401,745, filed on Feb. 21, 2012.

(60) Provisional application No. 61/601,415, filed on Feb. 21, 2012, provisional application No. 61/301,379, filed on Feb. 21, 2012, provisional application No. 61/601,435, filed on Feb. 21, 2012, provisional application No. 61/601,453, filed on Feb. 21, 2012.

(51) Int. Cl.
*G05B 19/042* (2006.01)
*G05B 11/01* (2006.01)

(52) U.S. Cl.
CPC ............ *G05B 19/0423* (2013.01); *G05B 11/01* (2013.01)

(58) Field of Classification Search
CPC ........................... G05B 19/0423; G05B 11/01
See application file for complete search history.

(56) References Cited

U.S. PATENT DOCUMENTS

| | | | |
|---|---|---|---|
| 7,565,351 B1 * | 7/2009 | Callaghan | G05B 19/0426 |
| 8,176,095 B2 | 5/2012 | Murray et al. | |
| 8,239,073 B2 | 8/2012 | Fausak et al. | |
| 8,375,068 B1 | 2/2013 | Platt et al. | |
| 9,170,579 B1 * | 10/2015 | Witter | G05B 19/0423 |
| 2007/0061018 A1 * | 3/2007 | Callaghan | G05B 19/05 700/1 |
| 2009/0043415 A1 | 2/2009 | Sun et al. | |
| 2009/0065596 A1 | 3/2009 | Seem et al. | |
| 2009/0157529 A1 | 6/2009 | Ehlers et al. | |
| 2009/0240380 A1 | 9/2009 | Shah et al. | |
| 2010/0106306 A1 | 4/2010 | Simon et al. | |
| 2010/0274366 A1 | 10/2010 | Fata et al. | |
| 2010/0324962 A1 | 12/2010 | Nesler et al. | |
| 2011/0071685 A1 | 3/2011 | Huneycutt et al. | |
| 2011/0082596 A1 | 4/2011 | Meagher et al. | |
| 2011/0173109 A1 | 7/2011 | Synesiou et al. | |
| 2011/0190952 A1 | 8/2011 | Goldstein | |
| 2012/0004785 A1 | 1/2012 | Son et al. | |
| 2012/0185104 A1 | 7/2012 | Unver et al. | |

(Continued)

*Primary Examiner* — Albert Wang
(74) *Attorney, Agent, or Firm* — Carr & Ferrell LLP

(57) ABSTRACT

A system for operating a plurality of energy consuming devices is provided. The system includes a database storing at least one device driver. The at least one device driver is for operating at least one device controller. At least one of the device drivers includes a database layer interface and a device layer interface. The system also includes a network interface coupling the database with a network. The network is coupled to the at least one device controller, and the database is adapted to transmit the device layer interface over the network to the at least one device controller. The at least one device controller controls a first energy consuming device of the plurality of energy consuming devices. A method for operating a plurality of energy consuming devices is provided that includes storing in a database at least one device driver.

18 Claims, 22 Drawing Sheets

(56) References Cited

U.S. PATENT DOCUMENTS

| | | |
|---|---|---|
| 2012/0296451 A1 | 11/2012 | Kaps et al. |
| 2013/0090770 A1 | 4/2013 | Lee et al. |
| 2013/0096727 A1 | 4/2013 | Brandt et al. |
| 2013/0178998 A1 | 7/2013 | Gadiraju et al. |
| 2013/0218349 A1 | 8/2013 | Coogan et al. |
| 2013/0218350 A1 | 8/2013 | Manzo |
| 2014/0039683 A1 | 2/2014 | Zimmermann et al. |

\* cited by examiner

FIG. 8B

SYSTEM AND METHOD FOR A DATABASE LAYER FOR MANAGING A SET OF ENERGY CONSUMING DEVICES

CROSS REFERENCE TO RELATED APPLICATIONS

This Non-Provisional U.S. Patent Application claims the priority benefit of U.S. Provisional Patent Application Ser. No. 61/601,415 filed on Feb. 21, 2012, U.S. Provisional Patent Application Ser. No. 61/601,379 filed on Feb. 21, 2012, U.S. Provisional Patent Application Ser. No. 61/601,435 filed on Feb. 21, 2012, U.S. Provisional Patent Application Ser. No. 61/601,453 filed on Feb. 21, 2012, and is a continuation-in-part of U.S. Non-Provisional patent application Ser. No. 13/401,745 filed on Feb. 21, 2012, which are incorporated by reference herein in their entirety.

FIELD OF THE INVENTION

The present invention relates generally to management of energy consuming devices, and more specifically, to a database layer for managing energy consuming devices.

BACKGROUND

Many companies analyze and manage field device sensor data and energy consumption individually and at a high cost. The standard architecture for such systems causes extremely slow data display, with page switching times of thirty or more seconds, leading to a poor user experience.

Data display may be designed on a site level, since that is where the controls exist, and therefore multi-site data integration may be difficult. User interface (UI) customization tools may be proprietary and specific to the system installed, resulting in the installing company doing all the UI development and customization for the end user.

Many companies with several types of field devices have difficulty polling sensor data or energy consumption information from each field device because each type of field device communicates differently. Current energy management software systems are often proprietary to the manufacturer's platform. Therefore, once the initial vendor decision is made, users often face high switching costs and cannot easily shop for competitively priced platforms due to system incompatibility.

Extensive and in-depth analysis of energy management data may be time consuming and difficult. Energy analytics may be done by a team of engineers, and may take months from the data generation time to be returned to the user.

SUMMARY OF THE INVENTION

According to exemplary embodiments, the present invention provides an energy management technology including systems and methods for operating a database layer within a tiered architecture for managing control devices.

A database system for multi-site device control is provided that includes a memory for storing data including at least sensor data, energy usage, and output settings, each datum including an associated timestamp and device identifier. The database system also includes a device driver layer including a plurality of device drivers, each device driver adapted to communicate with a corresponding device type. The database system further includes a display driver including a plurality of display drivers, each display driver adapted to communicate with a corresponding display type. The database system additionally includes a processor for formatting, aggregating, or modulating the data according to pre-programmed or custom criteria to create processed data, the processed data being communicated to the display driver.

A system for operating a plurality of energy consuming devices is provided. The system includes a database storing at least one device driver. The at least one device driver is for operating at least one device controller. At least one of the device drivers includes a database layer interface and a device layer interface. The system also includes a network interface coupling the database with a network. The network is coupled to the at least one device controller, and the database is adapted to transmit the device layer interface over the network to the at least one device controller. The at least one device controller controls a first energy consuming device of the plurality of energy consuming devices.

The database may enable a client to modify, update and/or disable the at least one device driver stored in the database. The database may transmit the device layer interface over the network to the at least one device controller periodically and/or after the client at least one of modifies, updates and disables the at least one device driver stored in the database. The database may further store data associated with the plurality of energy consuming devices. The database may not permit a client to modify the data stored in the database. The at least one device driver may operate a plurality of device controllers, and the at least one device controller may be a plurality of device controllers. The database may transmit the device layer interface over the network to a further device controller of the plurality of device controllers, and the further device controller may control a second energy consuming device of the plurality of energy consuming devices.

The system may include a second database storing at least one second device driver. The at least one second device driver may operate the at least one device controller, and at least one of the second device drivers may include a second database layer interface and a second device layer interface. The network interface may couple the second database with the network, and the second database may be adapted to transmit the second device layer interface over the network to the at least one device controller when the database fails and/or the at least one device driver fails.

The system may include a second database storing at least one second device driver. The at least one second device driver may operate at least one second device controller and at least one of the second device drivers may include a second database layer interface and a second device layer interface. The network interface may couple the second database with the network, and the second database may be adapted to transmit the second device layer interface over the network to the at least one second device controller. The at least one second device controller may control a second energy consuming device of the plurality of energy consuming devices.

The database may enable a licensor of the at least one device driver to disable the at least one device driver stored in the database and cause the database to transmit a disabled version of the device layer interface over the network to the at least one device controller to disable the at least one device controller. The at least one device driver may be stored in the database in a virtual file system.

A method for operating a plurality of energy consuming devices is provided that includes storing in a database at least one device driver. The at least one device driver operates at least one device controller, and at least one of the device drivers includes a database layer interface and a device layer interface. The method also includes coupling the database to a network. The network is coupled to the at least one device controller. The database is adapted to transmit the device layer interface over the network to the at least one device controller. The at least one device controller controls a first energy consuming device of the plurality of energy consuming devices.

The method may include enabling a client to modify, update and/or disable the at least one device driver stored in the database. The method may include transmitting the device layer interface over the network to the at least one device controller periodically and/or after the client modifies, updates and/or disables the at least one device driver stored in the database.

The method may further include storing in the database data associated with the plurality of energy consuming devices. The method may include not permitting a client to modify the data stored in the database.

In the method, the at least one device driver may operate a plurality of device controllers, and the at least one device controller may be a plurality of device controllers. The method may include transmitting, by the database, the device layer interface over the network to a further device controller of the plurality of device controllers. The further device controller may control a second energy consuming device of the plurality of energy consuming devices.

The method may further include storing in a second database at least one second device driver. The at least one second device driver may operate the at least one device controller. At least one of the second device drivers may include a second database layer interface and a second device layer interface. The method may also further include coupling the second database to the network. The second database may be adapted to transmit the second device layer interface over the network to the at least one device controller when the database fails and/or the at least one device driver fails.

The method may further include storing in a second database at least one second device driver. The at least one second device driver may operate at least one second device controller, and at least one of the second device drivers may include a second database layer interface and a second device layer interface. The method may also further include coupling the second database to the network. The second database may be adapted to transmit the second device layer interface over the network to the at least one second device controller, and the at least one second device controller may control a second energy consuming device of the plurality of energy consuming devices.

The method may include enabling a licensor of the at least one device driver to disable the at least one device driver stored in the database and cause the database to transmit a disabled version of the device layer interface over the network to the at least one device controller to disable the at least one device controller.

A non-transitory computer readable medium having recorded thereon a program is provided. The program when executed causes a computer to perform a method for analyzing data from a plurality of energy consuming devices.

These and other advantages of the present invention will be apparent when reference is made to the accompanying drawings and the following description.

BRIEF DESCRIPTION OF THE DRAWINGS

FIGS. 8A-8E are screenshots of an exemplary graphical user interface according to an exemplary embodiment.

DETAILED DESCRIPTION OF EXEMPLARY EMBODIMENTS

Figure 1:
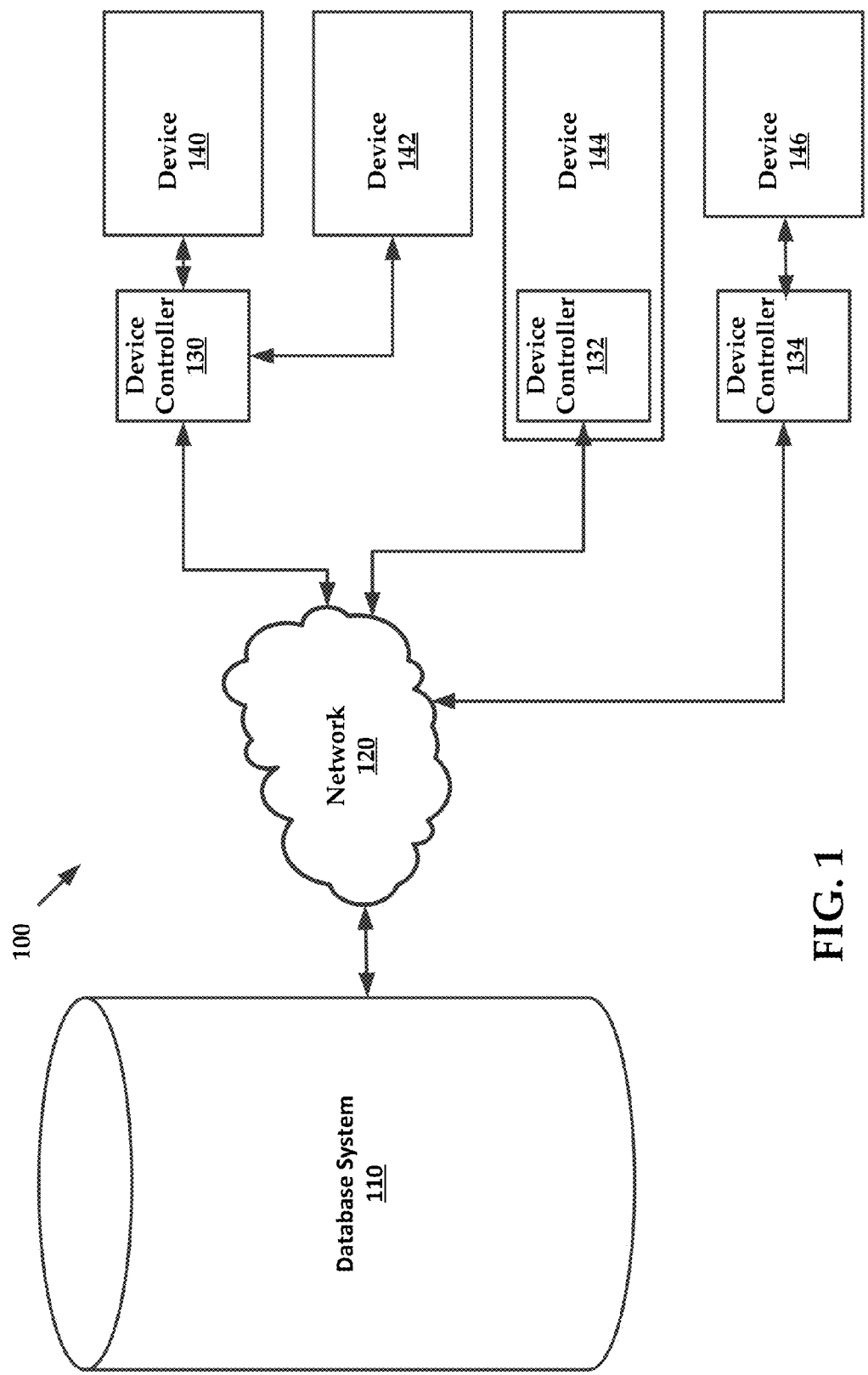
FIG. 1 illustrates a system according to an exemplary embodiment of the present technology.

While this invention is susceptible of embodiment in many different forms, there is shown in the drawings and will herein be described in detail several specific embodiments with the understanding that the present disclosure is to be considered as an exemplification of the principles of the invention and is not intended to limit the invention to the embodiments illustrated.

The present technology is directed to energy management. More specifically, the present technology provides agnostic multi-site device polling. A field device is hardware that can communicate, read a value, command a value, or has a value. Exemplary, but non-limiting examples of field devices in the device layer may include thermostats, pumps, fans, switches, timers, air-conditioning units, lights, etc., along with other field devices that would be known to one of ordinary skill in the art with the present disclosure before them.

The present technology provides an efficient, comprehensive solution for monitoring and managing energy consumption in a multi-site segment. The present technology separates controls into three discreet layers: device, data, and display, and is designed to be platform agnostic in all three of these layers. The present technology provides an improved user experience by displaying user requested data from the database layer, rather than from the field device layer. The average data page may load over ten times as fast as conventional systems, which may result in page switching times of less than two seconds. This can be contrasted with more than thirty seconds for other energy management systems.

Easy multi-site integration is provided using the present technology. Because all the data is stored at the database level, there is no inherent need to manipulate this data from a site-centric perspective. This allows more flexibility and speed in multi-site user displays, and enables a user to look at data in any manner preferred, rather than simply the way it was gathered.

The present technology also allows for extensive user-interface (UI) customization. Because the UI adheres to web standards, all the modern web graphical user interface (GUI) tools can be applied to create the user experience. The palette of options is much broader with the open tools available to web development than with any proprietary GUI development system.

The present technology also reduces platform switching costs. The present technology is platform agnostic at the device level, and therefore the data and display layers can rest on many different device layers, simultaneously. For example, even with a Cisco mediator in one building and a Trend BCX in another building, the present system seamlessly gives the user the same experience with respect to both buildings. The user can select hardware platforms based on pricing and features, and freely move between options, without changing their user experience.

The present technology also lowers monitoring costs. The database layer allows for a whole new level of logic, separate from controls logic: business logic. Monitoring and analytics, independent from controls, are easily imbedded into the database structure. The turn-around time for analytics in the database may be a few seconds.

The present technology increases technician efficiency. By using currently available software, when dispatched to a site, technicians may be required to contact a central service staff in order to learn what the current energy consumption characteristics are for that particular location. This results in the retail customer paying for two employees—their own technician and the central service personnel. With the present technology, technicians can access instant, current, building-specific data populated via a mobile device or tablet computer, enabling the avoidance of significant wait times and in turn, the reduction of on-site hours.

The present technology provides a Geographic Information System (WebGIS) Mapping, and specifically segments stores or other locations and enabling analysis of those within user-defined geographic areas. The importance of this functionality lies with the ability to track which stores are consuming above a specified average energy (for example measured in kWh/sq. ft.).

The present technology cross-references all sites within the user-defined geographic boundary and highlights buildings that are consuming above average levels of energy with respect to the average usage of the location. Managers can quickly, and in real-time, observe and evaluate energy usage across all locations. Outliers can be identified quickly and remotely brought back to the average usage level. Alternatively, if necessary, technicians can be dispatched to the site. If monitored by centralized service personnel, multi-site management can create a significant recurring revenue stream with a high profit margin.

The present technology provides an open architecture and modular software. Each of the layers in the present technology is designed to be platform agnostic. Any controls device that can communicate with another device using Modbus, bacnet, web interface, xml-rpc, or other application programming interface (API) can be integrated with the present technology. The present technology is built on the open standard MySQL database, and has been successfully run on various server operating systems, including Linux, MacOSX, and Windows. The displays of the present technology run with various web browsers, including Chrome, Safari, Firefox, and Internet Explorer. These displays can be on various web-enabled operating systems, including personal computers (PCs), Macintosh computers, iPads, iPhones, Android tablets, Android phones, and netbooks.

The present technology may pull data and aggregate information from multiple hardware manufacturers, and may provide Enterprise level security and user management tools. The present technology addresses software issues by having the ability to create any type of software application, with reduced development time and cost. The present technology uses the industry standard platforms of MySQL, PHP, and Apache, and includes an extensive, customized MySQL database and large library of PHP code that may not be available for viewing or editing by the end user.

The database structure enables management of extremely large volumes of data generated by multi-site control systems. The analytic tools used to convert raw data into user-friendly layouts and formats are embedded in the PHP code library. The complex data extraction tools, or 'drivers', needed to access the different field devices are embedded in the PHP code library.

In contrast to the propriety database structure, the data and metrics created by the present technology can be displayed by several web display technologies, including Adobe Flash or HTML5/CSS3/Javascript/Ajax.

The present technology encompasses analytics software for additional appliances including HVAC (heating, ventilation, and air conditioning), boiler and chillers, as well as other applications, including Demand Limiting, mobile device GUI with webGIS to pull data by physically being on-site, and Demand Response.

A database layer according to the present technology collects and organizes data from many different types of devices. The devices compatible with the database may collect different data including sensor data, output data, and energy consumption, all optionally marked with a timestamp. The data from the different devices may have different data formats and data transmission frequencies. The database layer may include a set of driver modules adapted to communicate with different types of devices. The communication may include commands to change an energy output, increase a data collection frequency, and/or change a control logic.

Controls logic may typically reside in a device controller of an energy consuming device. Alternatively, controls logic may reside in a database, specifically a database computer local to the device. In this case, the server may synchronize with the device's local database computer, and the database layer may therefore be embedded into two or more devices. A multi-device database layer in which the database resides in or directly coupled to device controllers along with a centralized web server database may have a speed and/or data integrity comparable to the system described herein in which the database layer resides only in a centralized web server. Part of the database may thereby be local to a particular energy consuming device, with controls logic for that device residing in that part of the database.

A database layer according to the present technology collects and organizes data from many different types of devices. The devices compatible with the database may collect different data including sensor data, output data, and energy consumption, all possibly marked with a timestamp. The data from the different devices may have different data formats and data transmission frequencies. The database layer may include a set of driver modules adapted to communicate with different types of devices. The communication may include commands to change an energy output, increase a data collection frequency, and/or change a control logic.

The database layer may also be adapted to communicate with one or more display devices including personal computers, tablet computers, and/or smartphones. Communication may be via the internet, wireless, or by any other appropriate method.

The database layer may include one or more levels of redundancy. The redundancy may include hot spares available at the production environment, the staging environment, and the development environment. The staging environment may be used by customers for internal testing purposes. Each of the servers and back-up servers at each level may also have off-site back-up protection to provide additional redundancy and data security.

The database may be adapted to remove identifier information to allow for the viewing of data useful to energy managers without violating confidentiality agreements.

The database may be an extensible database that allows access to data from remote sources as if the remote data were part of the database. The database may allow for multi-simultaneous read-write access to database. A queuing module may be integrated in the database to enable the simultaneous read-write capabilities.

In some exemplary embodiments, no matter what display type is selected, the database may store the data the same way. In some exemplary embodiments, the display may only interact with the database and the database may only interact with the device.

The business logic in the database may have quality analytics that address various situations. For example, a temperature sensor, which is normally between 50 and 70 degrees, may every once in a while give a value of 300 degrees. The 300 degree data point may be discarded since it is clearly erroneous. The display pulls data out of the database, which may have the effect of smoothing the data based on the business logic.

Command logging may be performed by the database recording each input and request by a user. The database may constantly pull from the device, and/or adjust the frequency based on historical or current data queries of a user. A large amount of data may then be pulled at a much higher frequency rate.

Business logic residing in the database may include alarm logic that triggers an alarm when a particular building's power usage is higher than a similarly sized and located building by more than a threshold amount. The modification goes in the database, which modifies the control of the devices, and/or the control logic of the devices. The database collects, receives and/or stores sensor or output data, and/or time stamp data. Alternatively, the time stamp may be provided by the database.

A section of the database is associated with being able to communicate with each type of device. A segment or layer of the database identifies where the data is coming from so that it can push out data in the right format and pull in data in the right format.

The user display may include multi-user displays accessing the database simultaneously. This provides a significant advantage over the prior art in which a device may be unable to satisfy multiple demands for data. By separating the data from the device, access to the data is vastly improved. The database structure is tag-based and flexible. The customer can modify any parameter and the database can be sorted based on the parameters to give entirely different graphs.

In further embodiments of the invention, the one or more device drivers may be adapted to receive digital packet information in a device format. The device driver may be adapted to transform the digital packet information from the field device format to a database format for storage. The one or more device drivers may also be adapted to receive database commands in a database format. The device driver may be adapted to transform the database command from a database format to a device format.

A display layer (also referred to as a display system) communicates with a database layer (also referred to as a database system), which in turn communicates with field device layer including one or more field devices. Some of the field devices may have integrated controllers, while some may have separate controllers. Some of the controllers may control more than one field device.

A database system for multi-site device control may include a memory to store data including at least sensor data, energy usage, and output settings, each datum including an associated timestamp and device identifier. A device driver layer may include a plurality of device drivers with each device driver adapted to communicate with a corresponding device type. A display driver may include a plurality of display drivers with each display driver adapted to communicate with a corresponding display type. A processor formats, aggregates, and/or modulates the data according to pre-programmed or custom criteria to create processed data. The processed data is communicated to the display driver.

FIG. 1 illustrates system 100 according to an exemplary embodiment. System 100 includes database system 110 in bilateral communication with network 120. Network 120 may be the Internet, an intranet, an extranet, a WAN, a wireless network, a telephone network, a mobile phone network, or any other appropriate network communication system. Network 120 is electrically coupled to device controllers 130, 132, and 134. Device controller 130 controls devices 140 and 142. Alternatively, a device controller may control more than two devices. Device controller 132 is integrated with and controls device 144. Device controller 134 controls device 146.

A query module may be adapted to receive a sensor data query or an energy consumption query. A database layer's analysis engine may process a received query using the device information. A display module may deliver the processed query to a display layer. In some embodiments, the display layer may include more than one display device. For example, the display module may deliver the processed query to a computer display and a smartphone display in the display layer. Additionally, the display module may deliver one processed query to a computer and a second processed query to a second computer at a different location.

Figure 2A:
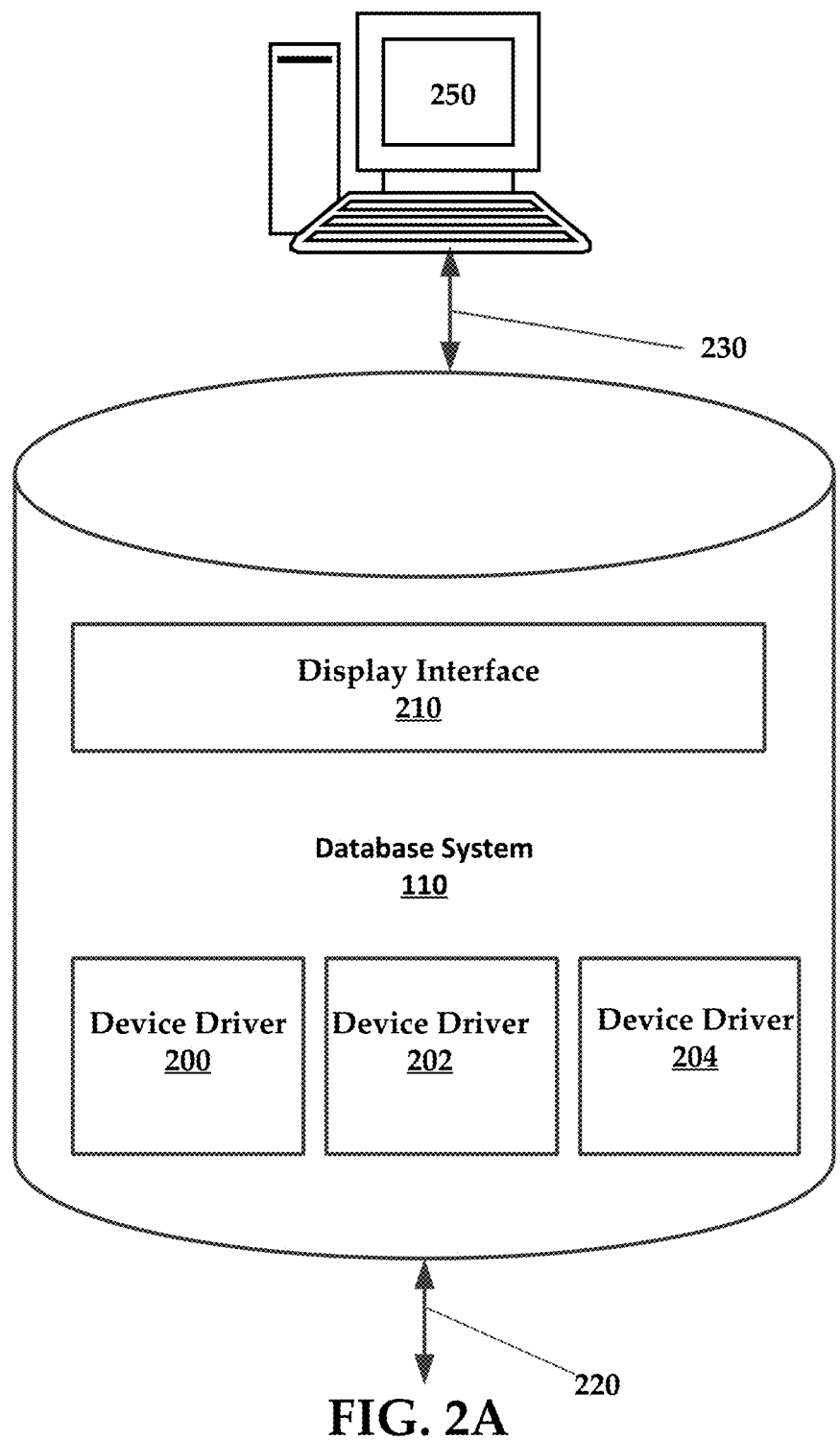
FIG. 2A illustrates an exemplary database system.

FIG. 2A illustrates database system 110 according to an exemplary embodiment. Database system 110 includes display interface 210, which may facilitate bi-lateral communication via link 230 with display system 250. Link 230 may be the Internet, an intranet, a wide area network, a wireless network, or any appropriate electronic communication system. Display system 250 may be a personal computer, laptop, server, or any other appropriate display device. Database system 110 also includes device drivers 200, 202 and 204, which may be stored in a file system, and which may be communicated to a device controller over link 220. Link 220 may be the Internet, an intranet, a wide area network, a wireless network, or any appropriate electronic communication system, and may couple to network 120 shown in FIG. 1.

Figure 2B:
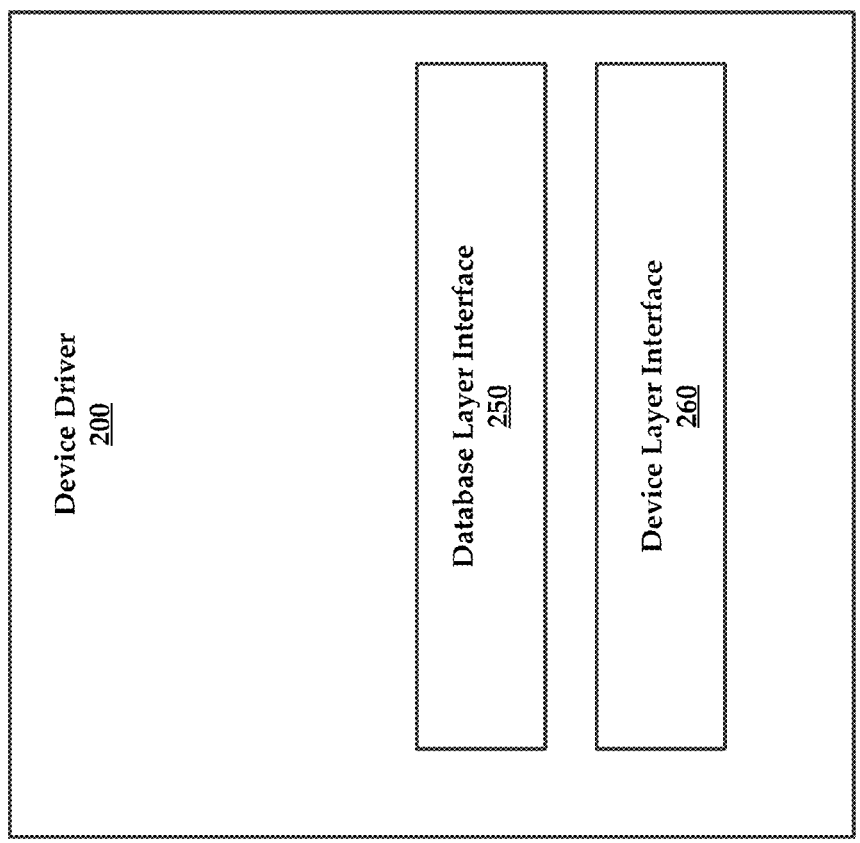
FIG. 2B illustrates a device driver according to an exemplary embodiment.

FIG. 2B illustrates device driver 200 according to an exemplary embodiment. Device driver 200, which may be stored in a database, for instance in a file system, may include database layer interface 250 (also referred to as the device database layer, device driver database interface, or the database interface) and device layer interface 260 (also referred to as the device layer, the device interface, the device driver interface, or the device driver). Device driver 200 may be modified by a client or agent, and re-stored in the database. Device layer interface 260 may be communicated to a device controller over the Internet, an intranet, a wide area network, a wireless network, or any appropriate electronic communication system. Device layer interface 260 may control the operation of a device controller, and therefore may also control the corresponding device or devices. Device layer interface 260 may be modified by a client or agent and re-stored in the database. After modification, device layer interface 260 may automatically be communicated by the database to a device controller. Alternatively, device layer interface 260 may be periodically communicated to a device controller, or periodically communicated only when changes have been made to device layer interface 260.

In the situation in which an owner or operator of a facility using field devices according to the present technology has licensed device driver 200 from database system 110 operator, when the license is terminated, the operator of database system 110 may disable device driver 200 stored in database system 110 and cause database system 110 to transmit over link 220 a disabled version of device layer interface 260 over network 120 to at least one of device controller 130, 132 and 134. The disabled version of device layer interface 260 may operate to disable the at least one of device controller 130, 132 and 134.

Database system 110 may have a redundant web server configuration having one or more of the following features: 1) replicated databases, 2) scheduled backups to provide a second layer of protection in the case of a server crash, 3) redundant server with replication and IP Heartbeat provides for immediate failover and zero loss of data, 4) does not require constant monitoring or support, 5) no human intervention required for failure or recovery, and 6) proven open-source architecture with a long-term track record under sustained loads.

Figure 3:
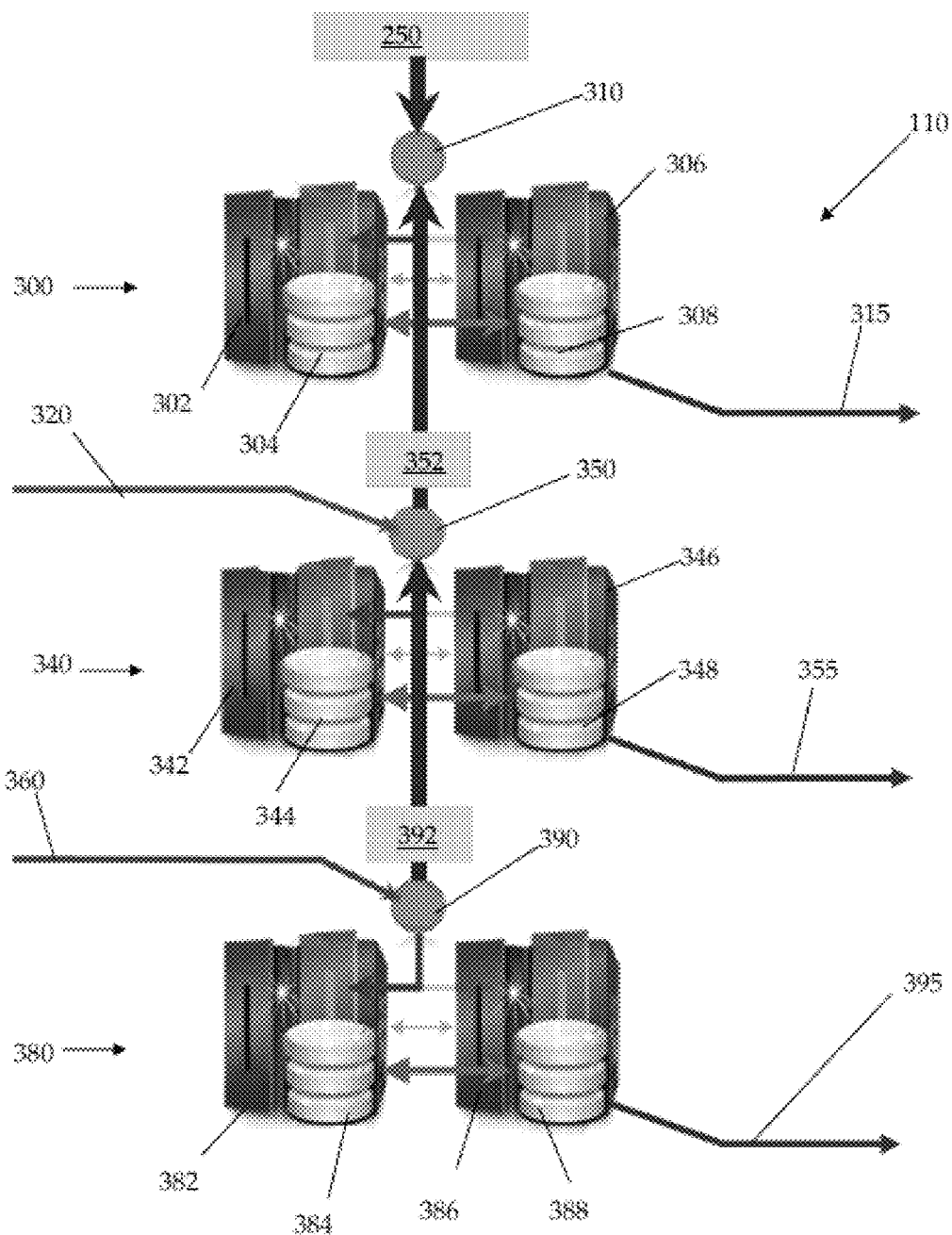
FIG. 3 is a diagram illustrating a database layer according to an exemplary embodiment.

FIG. 3 is a diagram illustrating database system 110 according to an exemplary embodiment. Database system 110 includes production environment 300, staging environment 340, and development environment 380. Display system 250 may communicate with production environment 300 of database system 110 through production public IP address 310. Additionally or alternatively, a field device and/or a sub-system controller including one or more field devices may communicate with production environment 300 of database system 110 through production public IP address 310.

Production environment 300 may include primary production web server 302, primary production database 304, secondary production web server 306, and secondary production database 308. Primary production web server 302 may bilaterally communicate with secondary production web server 306, and primary production database 304 may bilaterally communicate with secondary production database 308. Secondary production database 308 may communicate with a backup system which may be remotely located to prevent catastrophic loss of data due to failure of both primary production database 304 and secondary production database 308.

Customers may preview or review internally and/or test a new database system in staging environment 340 of database system 110 through link 320 to staging public IP address 350. Additionally or alternatively, a field device and/or a sub-system controller including one or more field devices may communicate with staging environment 340 of database system 110 through staging public IP address 350.

Staging environment 340 may include primary staging web server 342, primary staging database 344, secondary staging web server 346, and secondary staging database 348. Primary staging web server 342 may bilaterally communicate with secondary staging web server 346, and primary staging database 344 may bilaterally communicate with secondary staging database 348. Secondary staging database 348 may communicate with a backup system which may be remotely located to prevent catastrophic loss of data due to failure of both primary staging database 344 and secondary staging database 348.

Developers may generate code, review and/or test a new database system in development environment 380 of database system 110 through link 360 to development public IP address 390. Additionally or alternatively, a field device and/or a sub-system controller including one or more field devices may communicate with development environment 380 of database system 110 through development public IP address 390.

Development environment 380 may include primary development web server 382, primary development database 384, secondary development web server 386, and secondary development database 388. Primary development web server 382 may bilaterally communicate with secondary development web server 386, and primary development database 384 may bilaterally communicate with secondary development database 388. Secondary development database 388 may communicate with a backup system which may be remotely located to prevent catastrophic loss of data due to failure of both primary development database 384 and secondary development database 388.

Development of a new production environment 300 may start in development environment 380 and progress through staging transition 392 to staging environment 340. From staging environment 340, the development may progress through publishing transition 352 to production environment 300. Database outputs 315, 355 and 395 may couple to link 220 shown in FIG. 2A for outputting device layer interfaces (alternatively referred to as device drivers or device driver interfaces) to device controllers.

From a web server database, a replicated, redundant web server configuration may be developed using the following steps. First, by deploying a second, identical server and implementing MySQL Master-to-Master replication, a "Hot-Spare" server (also referred to herein as secondary production webserver 306) is provided with data that is only milliseconds behind the primary web server.

The next step in the development is deploying an IP failover daemon, which enables the two servers to share a common public IP address and causing all traffic to be routed through that public IP. Therefore, when the primary web server fails, the secondary web server takes over the public IP address and handles all of the traffic. For example, if the primary web server fails, within 700 ms, failure is detected, and the public IP is moved and traffic is redirected to the secondary web server. When the primary web server comes back online (either due to reduced load or human intervention), replication resumes. Once replication has caught up and both databases are back in sync, the primary web server may regain control.

The next step in the development implements a content management framework that is database driven, thereby allowing the running code to take advantage of the features provided by MySQL replication and an IP failover daemon. In addition, the framework provides a publishing mechanism, which allows for easy transfer of code from development to production, including rollback and scheduled pushes. By creating a separate development environment, the production environment may remain uncorrupted.

The next step in the development provides a staging environment, which encourages the maintenance of an uncorrupted production environment. Finally, database backups are made at each level in the stack to provide a fourth layer of backup at the production level and a third layer of backup at the staging and development level. At any one time, there may be no less than eight copies of the content and code at various stages of production, excluding offline backups. Backups may be performed on the secondary web servers, reducing the load on the primary web server, which is extremely important for large data sets.

Figure 4:
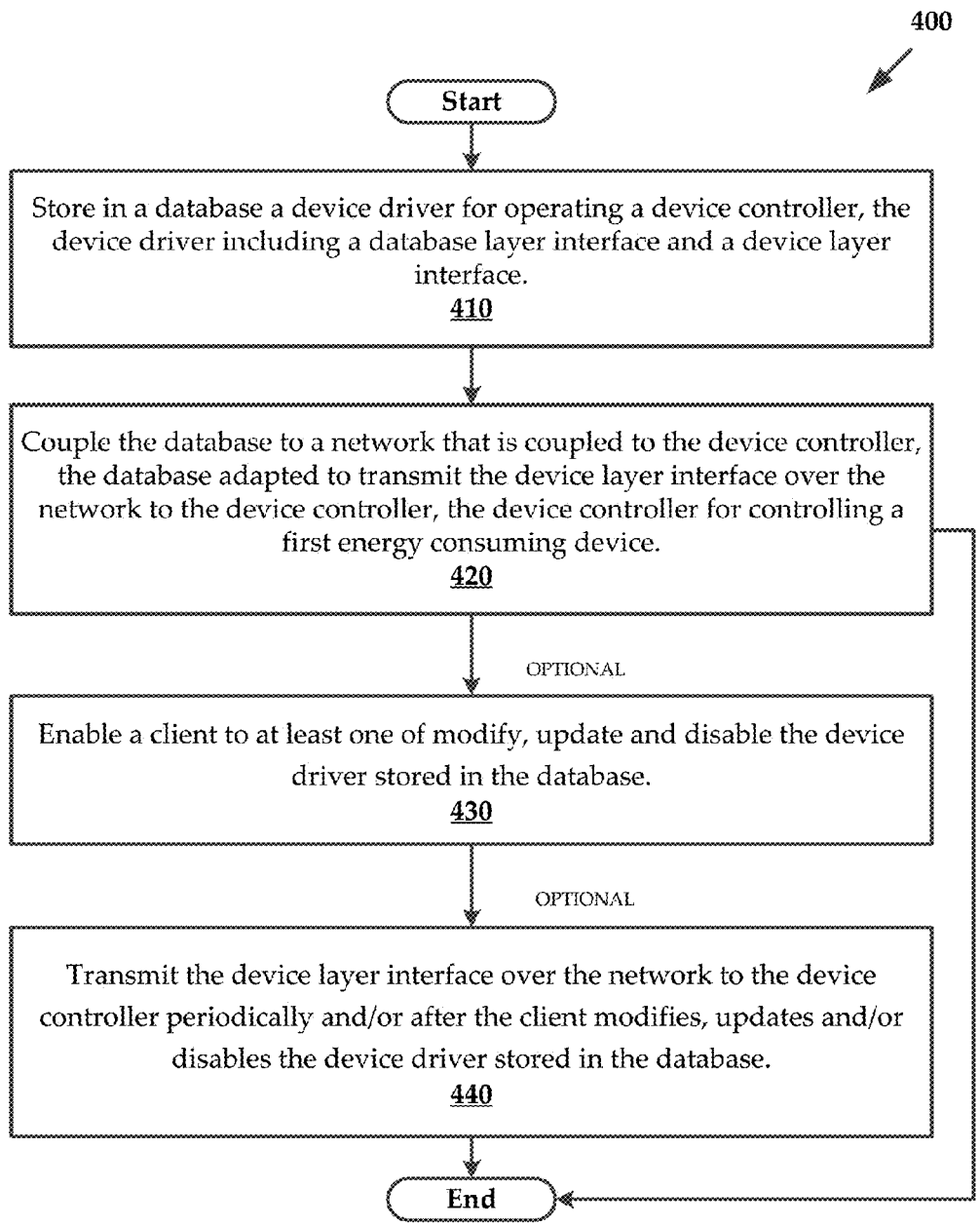
FIG. 4 is a flow chart illustrating an exemplary method.

FIG. 4 illustrates method 400 according to the present technology. Method 400 proceeds from a start oval to operation 410, which indicates to store in a database a device driver.

Operation 410 additionally indicates that the device driver is for operating a device controller, and that the device driver includes a database layer interface and a device layer interface. From operation 410, the flow proceeds to operation 420, which indicates to couple the database to a network. Operation 420 additionally indicates that the network is coupled to the device controller, and that the database is adapted to transmit the device layer interface over the network to the at least one device controller. Operation 420 further indicates that the device controller is for controlling a first energy consuming device. From operation 420, the flow optionally proceeds to operation 430, which indicates to enable a client to modify, update and/or disable the device driver stored in the database. From operation 430, the flow optionally proceeds to operation 440, which indicates to transmit the device layer interface over the network to the device controller periodically and/or after the client modifies, updates and/or disables the device driver stored in the database. From operation 440, the flow proceeds to an end oval.

Figure 5:
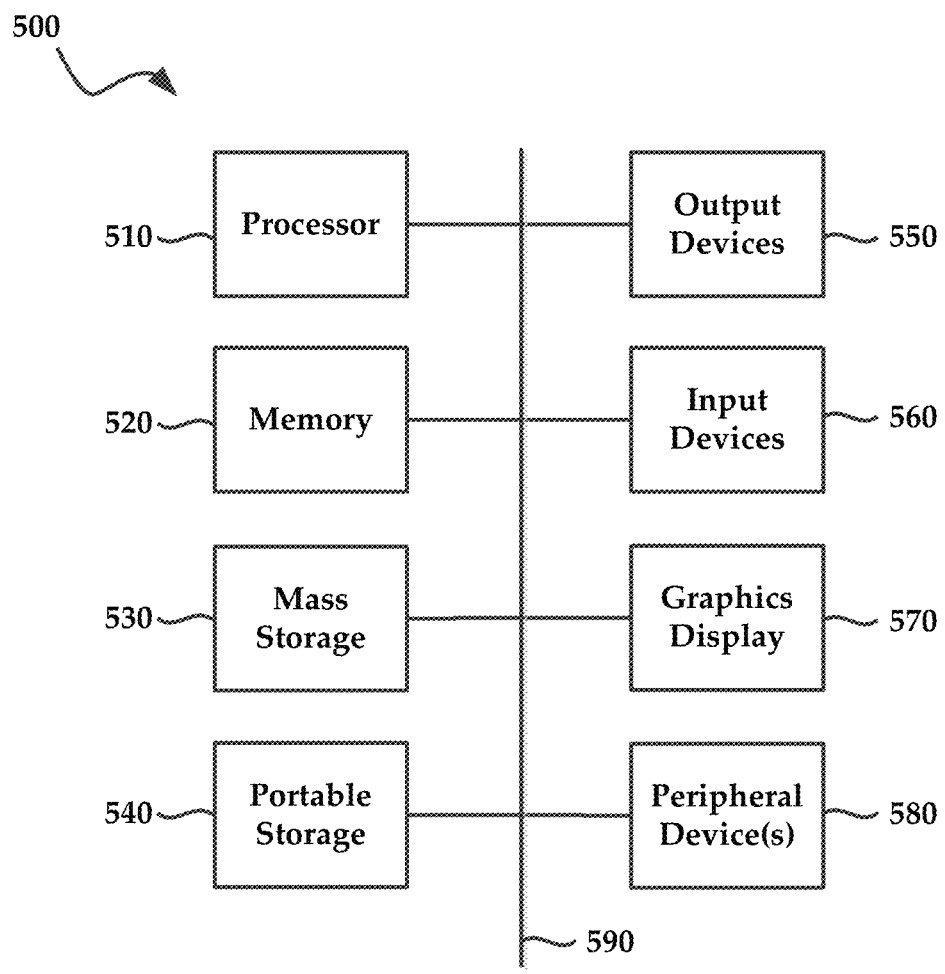
FIG. 5 illustrates a computer system according to an exemplary embodiment.

FIG. 5 illustrates an exemplary computing system 500 that may be used to implement an embodiment of the present technology. Database system 110, network 120, device controllers 130, 132 and 134, devices 140, 142, 144 and 146 and/or display system 250 may include one or more of the components of computing system 500. Additionally or alternatively, computing system 500 may be used to implement method 400 of FIG. 4. The computing system 500 of FIG. 5 includes one or more processors 510 and memory 520. Memory 520 stores, in part, instructions and data for execution by the one or more processors 510. Memory 520 can store the executable code when the computing system 500 is in operation. The computing system 500 of FIG. 5 may further include a mass storage 530, portable storage 540, output devices 550, input devices 560, a graphics display 570, and other peripheral device(s) 580.

The components shown in FIG. 5 are depicted as being connected via a single bus 590. The components may be connected through one or more data transport means. The one or more processor 510 and memory 520 may be connected via a local microprocessor bus, and the mass storage 530, peripheral device(s) 580, portable storage 540, and graphics display 570 may be connected via one or more input/output (I/O) buses.

Mass storage 530, which may be implemented with a magnetic disk drive or an optical disk drive, is a non-volatile storage device for storing data and instructions for use by processor 510. Mass storage 530 can store the system software for implementing embodiments of the present technology for purposes of loading that software into memory 520.

Portable storage 540 operate in conjunction with a portable non-volatile storage medium, such as a floppy disk, compact disk or digital video disc, to input and output data and code to and from the computing system 500 of FIG. 5. The system software for implementing embodiments of the present technology may be stored on such a portable medium and input to the computing system 500 via the portable storage 540.

Input devices 560 provide a portion of a user interface. Input devices 560 may include an alphanumeric keypad, such as a keyboard, for inputting alphanumeric and other information, or a pointing device, such as a mouse, a trackball, stylus, or cursor direction keys. Additionally, the computing system 500 as shown in FIG. 5 includes output devices 550. Suitable output devices include speakers, printers, network interfaces, and monitors.

Graphics display 570 may include a liquid crystal display (LCD) or other suitable display device. Graphics display 570 receives textual and graphical information, and processes the information for output to the display device.

Peripheral device(s) 580 may include any type of computer support device to add additional functionality to the computing system. Peripheral device(s) 580 may include a modem or a router.

The components contained in the computing system 500 of FIG. 5 are those typically found in computing systems that may be suitable for use with embodiments of the present technology and are intended to represent a broad category of such computer components that are well known in the art. Thus, the computing system 500 of FIG. 5 can be a personal computer, hand held computing system, telephone, mobile computing system, workstation, server, minicomputer, mainframe computer, or any other computing system. The computer can also include different bus configurations, networked platforms, multi-processor platforms, etc. Various operating systems can be used including UNIX, Linux, Windows, Macintosh OS, Palm OS, and other suitable operating systems.

Figure 6:
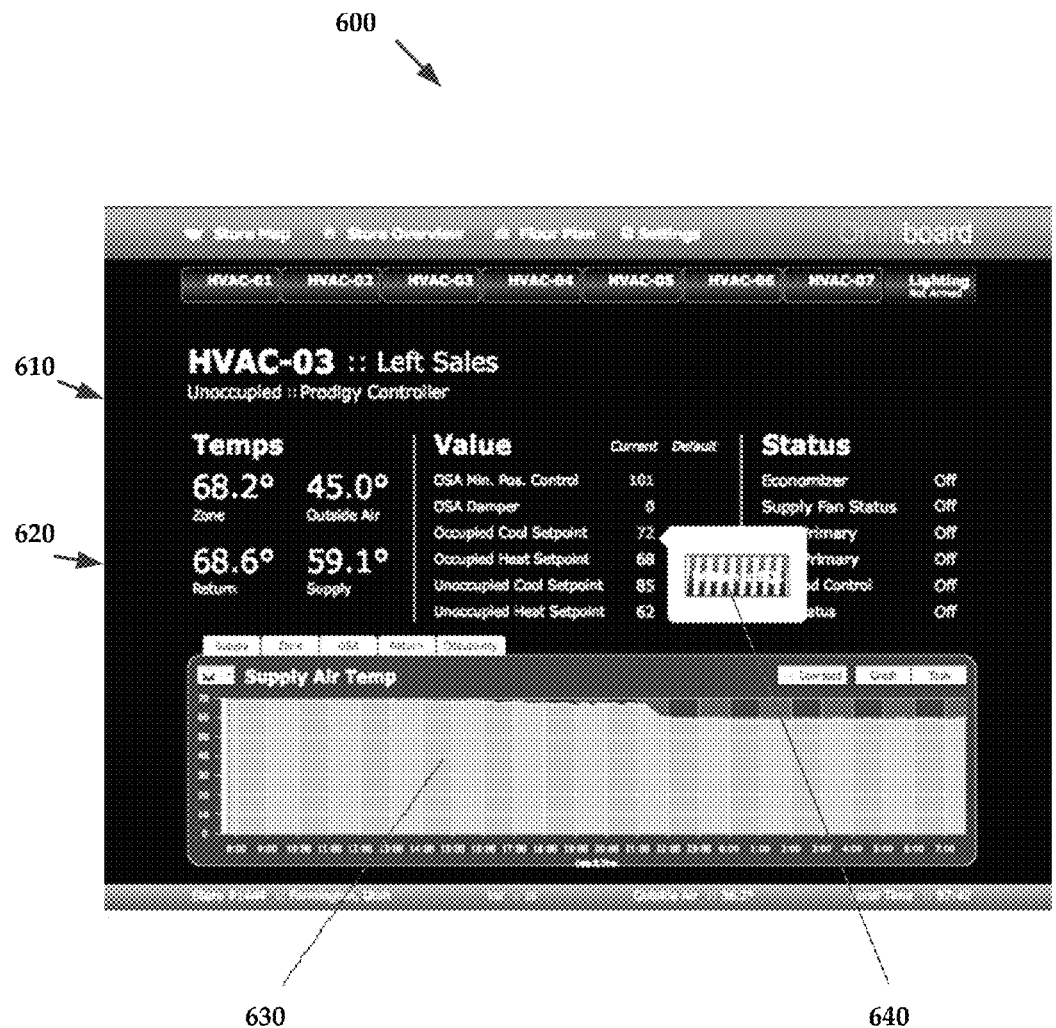
FIG. 6 is a screenshot of an exemplary graphical user interface according to an exemplary embodiment.

FIG. 6 is a screenshot of graphical user interface 600 according to an exemplary embodiment. Graphical user interface 600 is an exemplary, customizable interface enabling a user to monitor energy usage at an energy consuming device (also referred to as a device, for example devices 140, 142, 144 and 146). Sensor data 620 obtained from a controller (also referred to as a device controller, for example device controllers 130, 132 and 134) associated with the energy consuming device is presented, along with historical values for the sensor data in the form of graph 630. Graphical user interface 600 includes callout 640 which has been superimposed on graphical user interface 600. Callout 640 indicates a data setpoint that may be adjusted by a user interacting with graphical user interface 600. The data setpoint adjustment may modify the business logic for controlling energy consuming device 610, and in particular may include an instruction written to the database in structured query language (SQL, a programming language designed for managing data in relational database management systems (RDBMS)).

Figure 7:
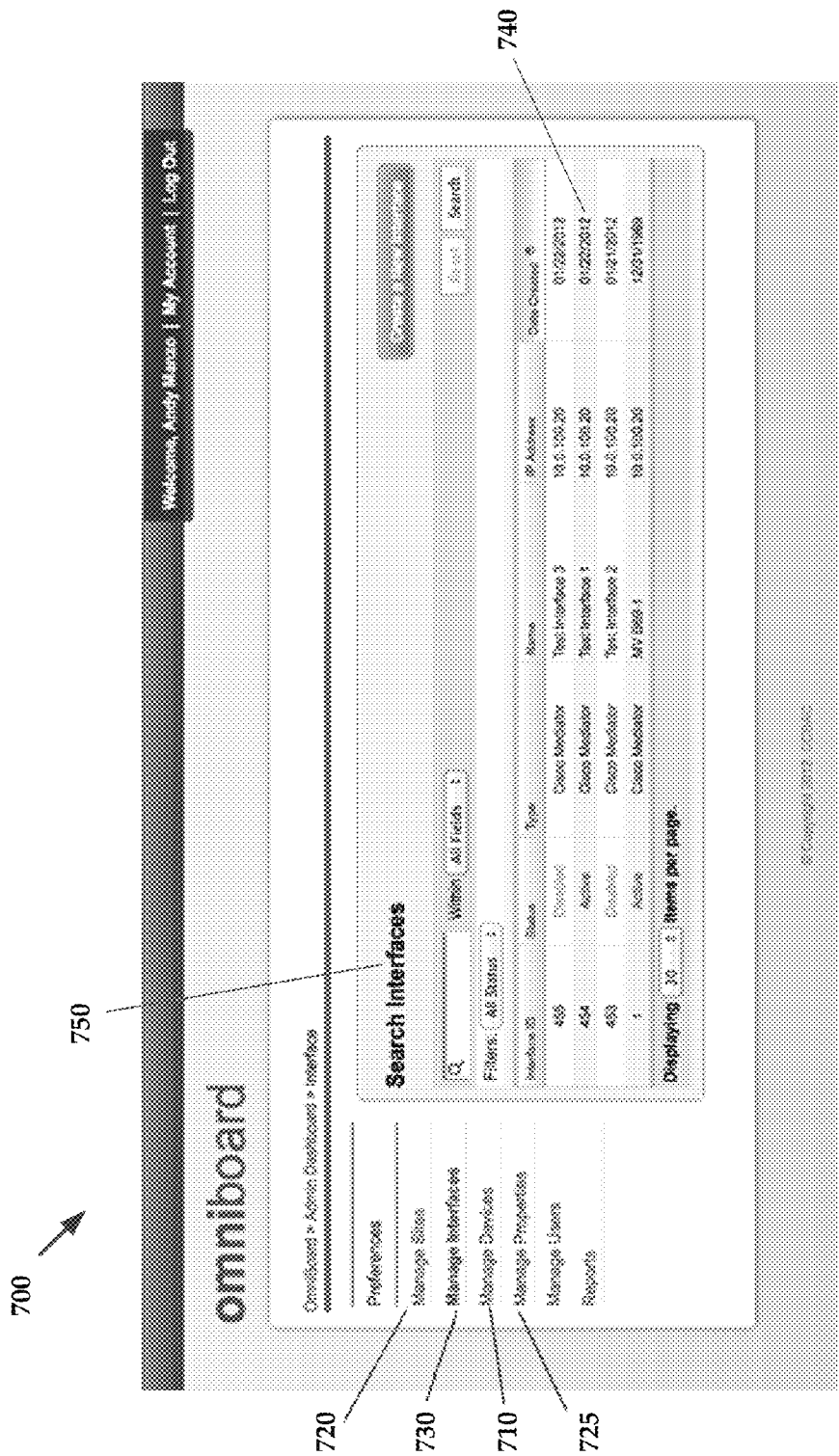
FIG. 7 is a screenshot of an exemplary graphical user interface according to an exemplary embodiment.

FIG. 7 is a screenshot of exemplary graphical user interface 700. Graphical user interface 700 includes a set of preferences on a navigation bar including manage sites 720, manage interfaces 730, manage devices 710, and manage properties 725. Manage properties 725 may be a collection of devices from manage devices 710. In FIG. 7, manage interfaces 730 is selected causing search interface 750 to be presented to the user. Within search interface 750, various controllers 740 for energy consuming devices are listed, including multi-site controllers, all of which may be controlled by a system according to the present technology. Controllers 740 in graphical user interface 700 are identified by an identifying number (interface ID), status, type, name, IP address, and date created. In this manner, a user may control at a simple and customizable GUI, via a database layer, any number of energy consuming devices.

Many companies with several types of field devices will have difficulty polling sensor data or energy consumption information from each field device because each type of field device communicates differently. The present invention relates generally to systems and methods for multi-site device polling.

The present technology provides a communication system for communicating between a database system and a plurality of energy consuming devices. The system includes a device identifier arrangement adapted to communicate with a plurality of device controllers of the energy consuming devices and adapted to identify a device category based on one of a data format received from the device controller and a self-identifying signal from the device controller. The system also includes a processor including a timer adapted to determine a rate of polling for the device, the rate of polling depending on a data demand based on one of an analytics module request, a data requirement manually entered by a user, and an automatic response to one of a user interest and data volatility. The system further includes a polling module responsive to the processor and adapted to use a format compatible with the device category, the polling module requesting data from the corresponding device controller including at least one of sensor data, timestamp data, and energy usage data.

System efficiency and convenience is improved by collecting and organizing the data from individual energy consuming devices in a multi-site device system. The collecting and organizing is performed by a database on a schedule that may be adaptive based on usage, data volatility, or any other appropriate criteria. For example, when a user is viewing data from a particular site, or from a group of sites, that site or group of sites may be polled more frequently. Similarly, if a site's data changes quickly, the database may be programmed to poll that site more frequently in order to store and provide for analysis more data.

In alternative embodiments, the database may not poll particular devices, and specifically devices not capable of being polled. In alternative embodiments not utilizing polling for one or more devices, those devices may unilaterally provide their data to the database on a schedule or in any other appropriate manner.

The collecting of data by the database may be performed by customized drivers adapted to communicate with any type of field hardware control. In this manner, data may be pulled from a device controller at a frequency within the capability of the device controller. The data may be stored, processed, and organized in the database layer. The format of the data may be changed or modified by the driver of the device at the database, or alternatively, the database may store all data in a raw format without processing. In the latter alternative, the database may process data prior to use in an analytics module in order that data from different devices may be easily compared.

The present technology provides an improved user experience by displaying user requested data from the database layer, rather than from the field device layer. The average data page loads over ten times as fast, which results in page switching times of less than two seconds. This can be contrasted with more than thirty seconds for other energy management systems.

The present technology also lowers monitoring costs. The database layer allows for a whole new level of logic, separate from controls logic: business logic. Monitoring and analytics, independent from controls, are easily imbedded into the database structure. The turn-around time for analytics in the database goes down from 30-60 days to mere seconds. It is fast and easy to know monitor energy usage.

The present technology increases technician efficiency. By using currently available software, when dispatched to a site, technicians are required to contact a central service staff in order to learn what the current energy consumption characteristics are of that particular location. This results in the retail customer paying for two employees—their own technician and the central service personnel. With the present technology, technicians can access instant, current, building-specific data populated via a mobile device (e.g. iPad), enabling the avoidance of significant wait times and in turn, the reduction of on-site hours.

The database structure enables management of extremely large volumes of data generated by multi-site control systems. The analytic tools used to convert raw data into user-friendly layouts and formats are embedded in the PHP code library. The complex data extraction tools, or 'drivers', needed to access the different field devices are embedded in the PHP code library.

In one embodiment, the information received by the device driver may include a combination of: a unique device identifier, energy consumption of the device, device sensor data and/or a timestamp. For example, a pump may return information that it is identified as "Pump A" and has a power reading of 20 kWh at 2:00 PM, Feb. 14, 2012. In other embodiments, the information may only be the energy consumption or sensor data of the field device, in which case the device driver may be adapted to assign the sensor data or energy consumption information with a timestamp and/or a unique field device identifier as needed. For example, a thermostat may be designed to return only a temperature reading. The device driver corresponding to the thermostat may be adapted to tag the thermostat, "Thermostat #15" and may tag the sensor data returned with a timestamp. A storage module may continuously store and organize the information received in tables or a series of tables in a database.

In further embodiments of the invention, the one or more device drivers may be adapted to receive digital packet information in a device format. The device driver may be adapted to transform the digital packet information from the field device format to a database format for storage. The one or more device drivers may also be adapted to receive database commands in a database format. The device driver may be adapted to transform the database command from a database format to a device format.

A communication system for communicating between a database system and a plurality of energy consuming devices is provided. The communication system includes a device identifier arrangement adapted to communicate with a plurality of device controllers of the energy consuming devices and adapted to identify a device category based on one of a data format received from the device controller and a self-identifying signal from the device controller. The communication system may also include a processor including a timer adapted to determine a rate of polling for the device. The rate of polling may depend on 1) a data demand based on one of an analytics module request, 2) a data requirement manually entered by a user, and 3) an automatic response to one of a user interest and data volatility. The communication system may further include a polling module responsive to the processor and adapted to use a format compatible with the device category. The polling module may request data from the corresponding device controller including sensor data, timestamp data, and/or energy usage data.

Figure 8A:
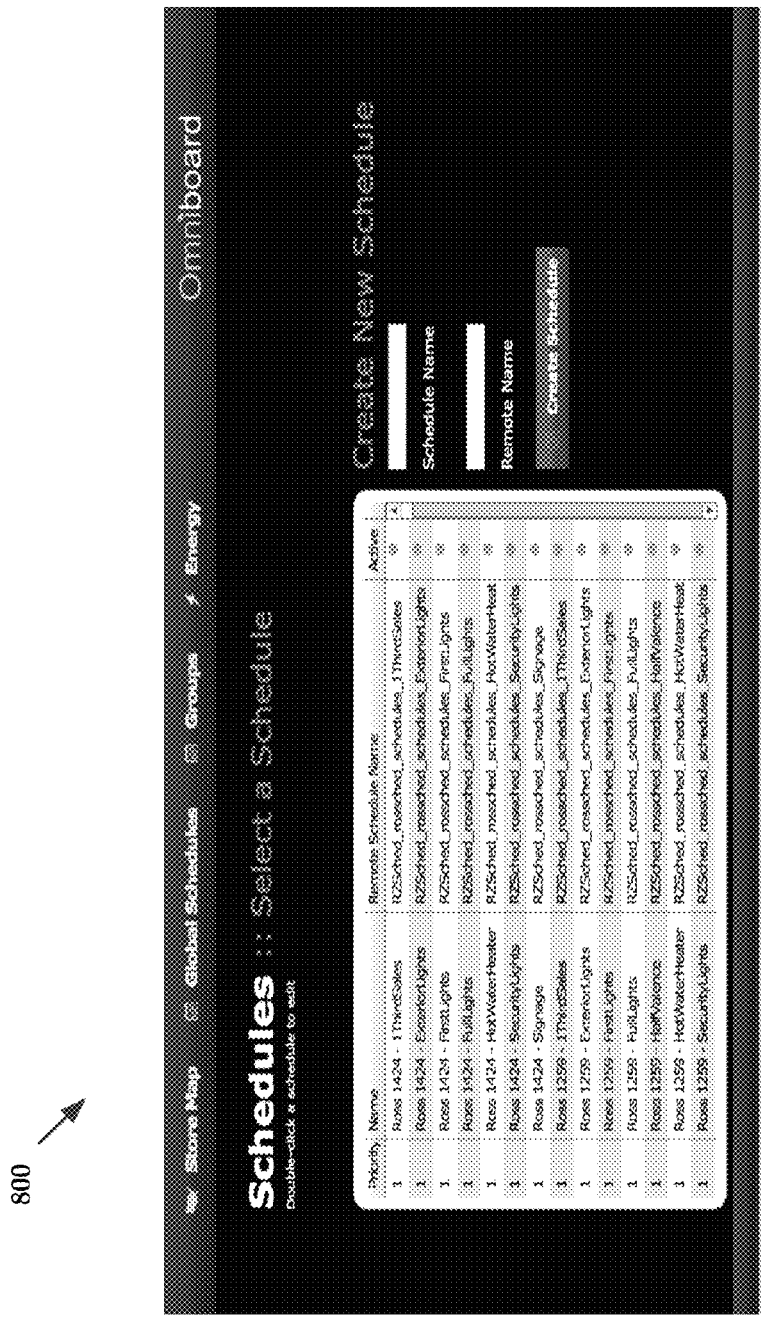

FIG. 8A is a screenshot of exemplary graphical user interface 800 for managing any number of energy consuming devices.

Figure 8B:
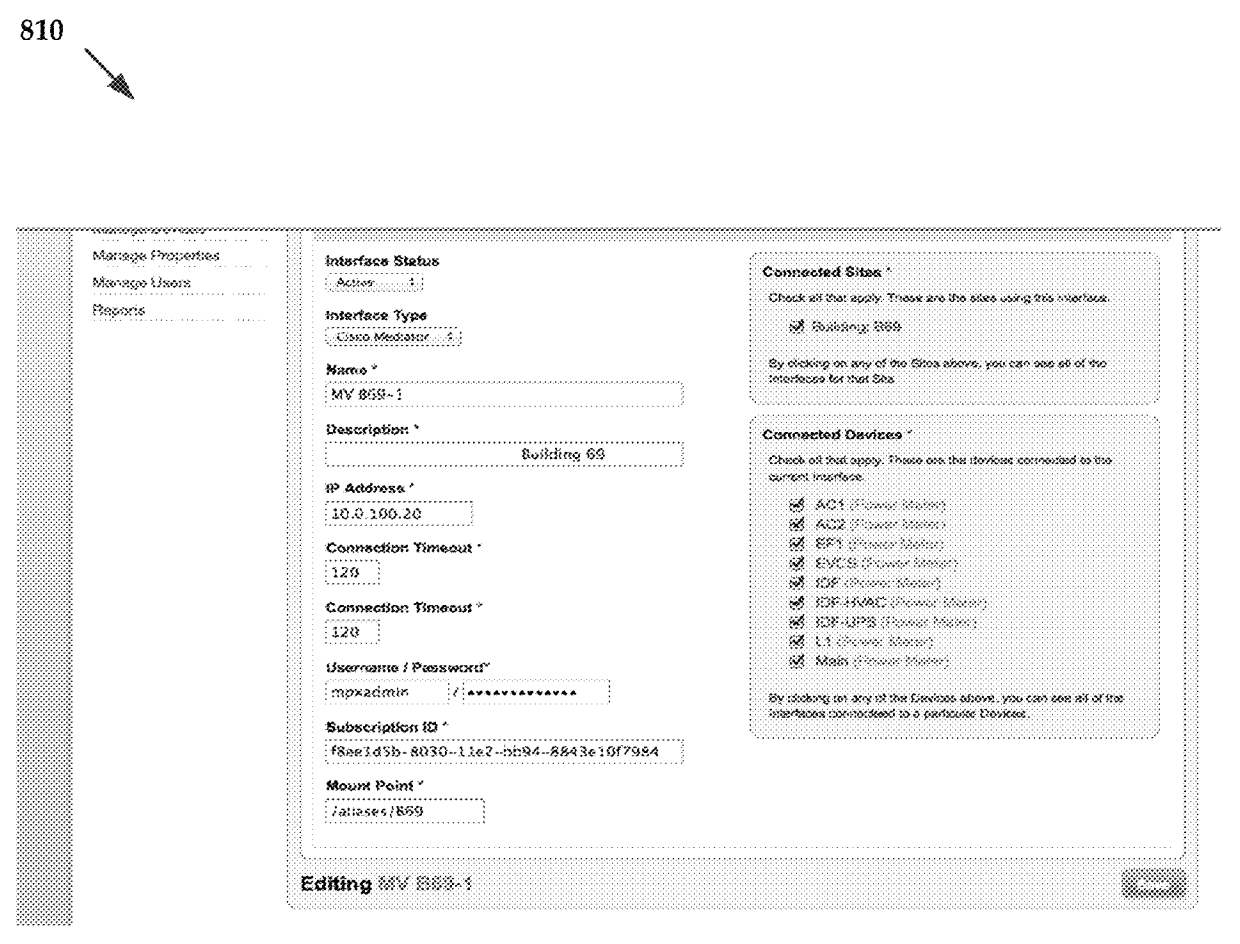

FIG. 8B is a screenshot of exemplary graphical user interface 810 for managing any number of energy consuming devices.

Figure 8C:
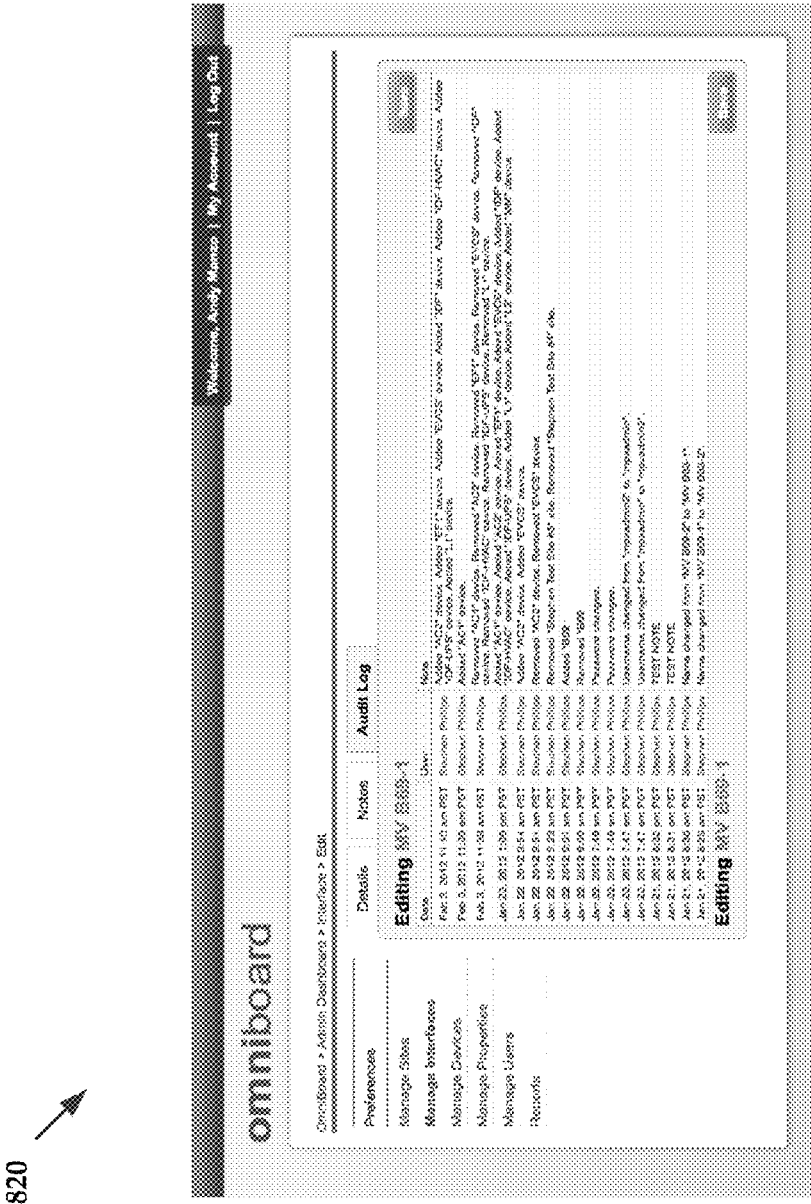

FIG. 8C is a screenshot of exemplary graphical user interface 820 for managing any number of energy consuming devices.

Figure 8D:

FIG. 8D is a screenshot of exemplary graphical user interface 830 for managing any number of energy consuming devices.

Figure 8E:
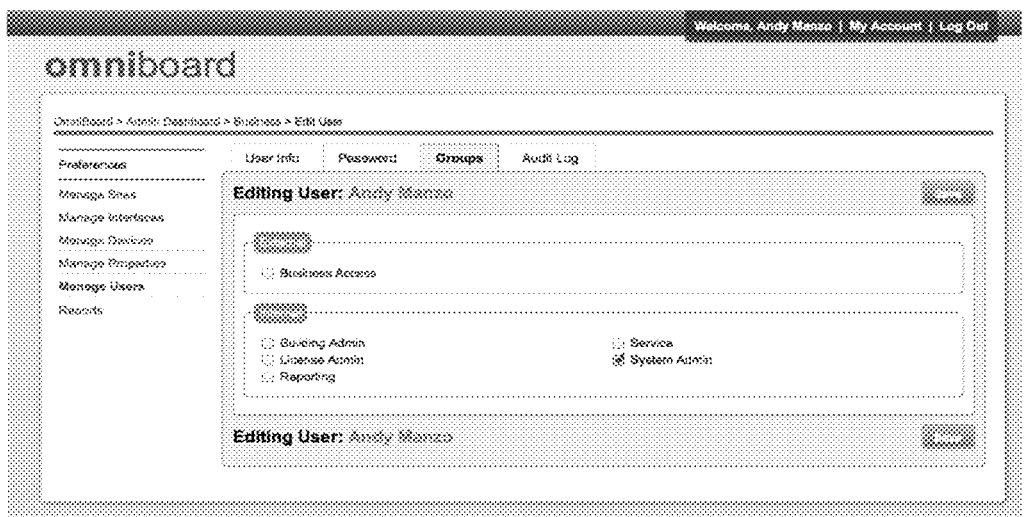

FIG. 8E is a screenshot of exemplary graphical user interface 840 for managing any number of energy consuming devices.

Figure 9:
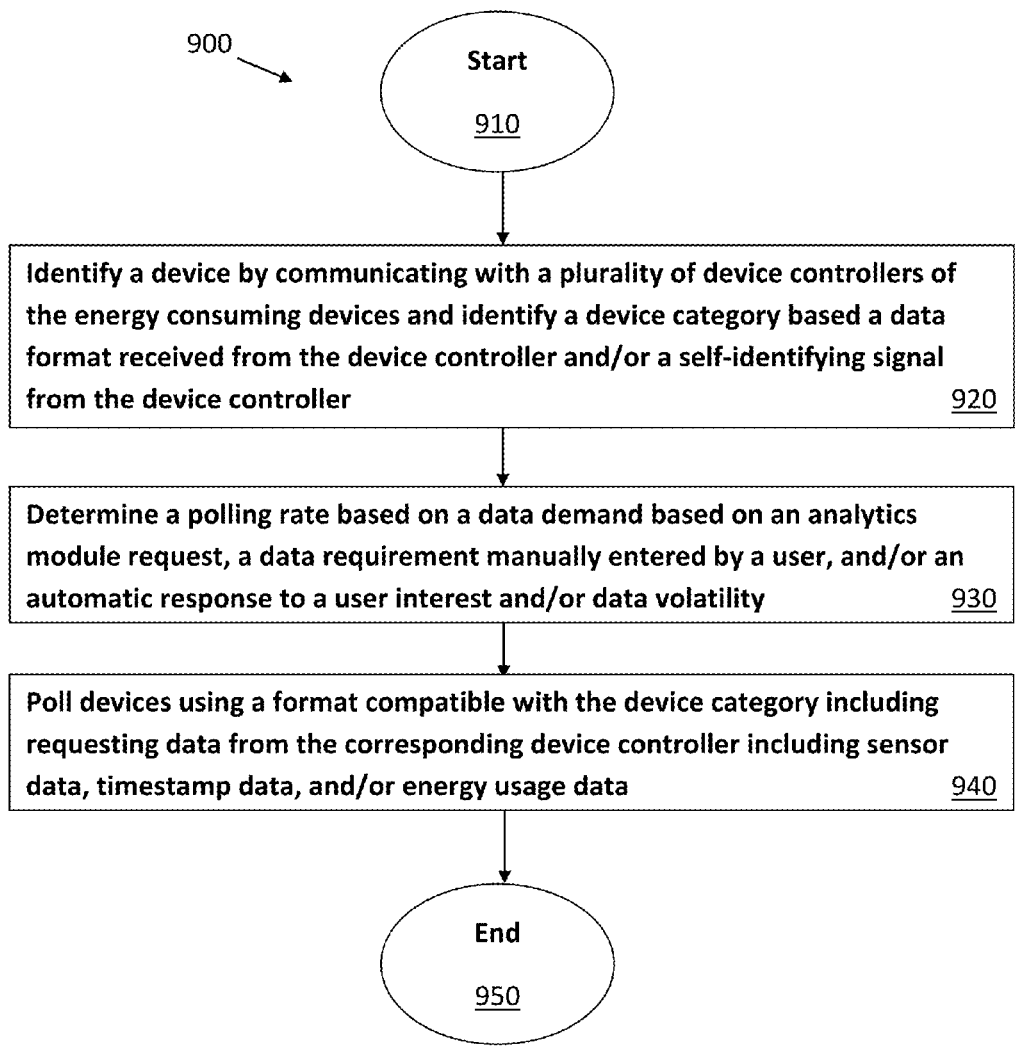
FIG. 9 is a flow chart illustrating an exemplary method.

FIG. 9 illustrates method 900 according to the present technology. Method 900 starts in start oval 910 and proceeds to operation 920, which indicates to identify a device by communicating with a plurality of device controllers of the energy consuming devices and identify a device category based on a data format received from the device controller and/or a self-identifying signal from the device controller. From operation 920, the flow proceeds to operation 930, which indicates to determine a polling rate based on a data demand based on an analytics module request, a data requirement manually entered by a user, and/or an automatic response to a user interest and/or data volatility. From operation 930, the flow proceeds to operation 940, which indicates to poll devices using a format compatible with the device category including requesting data from the corresponding device controller including sensor data, timestamp data, and/or energy usage data. From operation 940, the flow in method 900 proceeds to end oval 950.

Systems and methods for agnostic multi-site device control are provided. In a system according to one embodiment, a display layer is coupled in two-way communication with a database layer. The database layer is coupled in two-way communication with a device layer. The database layer may include an aggregator module. The aggregator module may be coupled to one or more device drivers which may continuously request and receive digital packet information from field devices in the device layer. The digital packet information may include in various combinations, a device identifier, sensor data, device energy consumption data, and/or a timestamp. Each device driver may be adapted to communicate with particular field devices in the device layer. Each device driver may be adapted to receive digital packet information from a field device in a field device format. Additionally, the device driver may be adapted to transform digital packet information received in a device format to a database format. The device driver may return the digital packet information in a database format to the database. A storage module may store the digital packet information received from the device driver in a table or series of tables in a database. A query module may be adapted to receive a query. An analysis engine processes a received query using the digital packet information to provide analytic capabilities. A display module returns the processed query to a display device in the display layer.

In some embodiments of the invention, the device layer may include multiple field devices. For example, the device layer may include two high volume air conditioners and/or three pumps. Additionally, a device layer may include systems which comprise multiple devices. For example, a meter may have a device for reading voltage Phase A, a device for reading voltage Phase B, and a device for reading voltage Phase C. Therefore a meter may comprise three field devices but may be treated as a single device. Moreover, the device layer may comprise field devices manufactured by different companies wherein the field devices may communicate with different interfaces. For example, the device layer may comprise: a power meter manufactured by Company A with Interface A, a heater manufactured by Company B with Interface B, a humidity meter manufactured by Company C with Interface C.

In an embodiment of the invention, the device driver may continuously request and receive information from field devices or systems in the device layer. For example, the device driver may poll a field device and in response the field device returns sensor data. In other embodiments, the device driver may only receive information from field devices or systems, because the field device is not adapted to receive requests. For example, a field device may be designed to collect data and return the collected data every two hours. In other embodiments of the invention, the one or more device drivers are adapted to work with particular field devices in the device layer. For example, the aggregator module may be coupled to Device Driver X and Device Driver Y. Device Driver X may be adapted to communicate specifically with Field Device X and Device Driver Y may be adapted to communicate specifically with Field Device Y. Additionally, in other embodiments of the invention, a device driver may be adapted to communicate with systems. For example Device Driver Z may be adapted to communicate with System Z, wherein System Z includes Field Device Z1, Field Device Z2 and Field Device Z3. In such instances, Device Driver Z may be adapted to poll all three System Z field devices simultaneously or in different combinations.

In an embodiment, the information received by the device driver may include a combination of: a unique device identifier, energy consumption of the device, device sensor data and/or a timestamp. For example, a pump may return information that it is identified as "Pump A" and has a power reading of 20 kWh at 2:00 PM, Feb. 14, 2012. In other embodiments, the information may only be the energy consumption or sensor data of the field device, in which case the device driver may be adapted to assign the sensor data or energy consumption information with a timestamp and/or a unique field device identifier as needed. For example, a thermostat may be designed to return only a temperature reading. The device driver corresponding to the thermostat may be adapted to tag the thermostat, "Thermostat #15" and may tag the sensor data returned with a timestamp. A storage module may continuously store and organize the information received in tables or a series of tables in a database.

In further embodiments of the invention, the one or more device drivers may be adapted to receive digital packet information in a device format. The device driver may be adapted to transform the digital packet information from the field device format to a database format for storage. The one or more device drivers may also be adapted to receive database commands in a database format. The device driver may be adapted to transform the database command from a database format to a device format.

A system for agnostic multi-site device control is provided that includes one or more device drivers coupled to an aggregator module. The one or more device drivers are adapted to request and receive digital packet information from one or more field devices in a device format. The digital packet information defines the field device, sensor data, energy consumption of the field device, and a timestamp. The one or more device drivers may be adapted to transform the received digital packet information from a device format into a database format, and the one or more device drivers may further be adapted to receive control instructions from a processor in the database format. The one or more device drivers may be adapted to transform the received control instructions in a database format into a device format, and the one or more device drivers may be adapted to send the control instructions in the device format to the one or more field devices. The system may further include a query module stored in a memory and executable by the processor to receive a query. The system may also include an analysis engine stored in memory and executable by the processor to process the query utilizing the digital packet information in database format. The system may additionally include a display module stored in memory and executable by the processor to deliver the processed query to one or more display devices.

Figure 10:
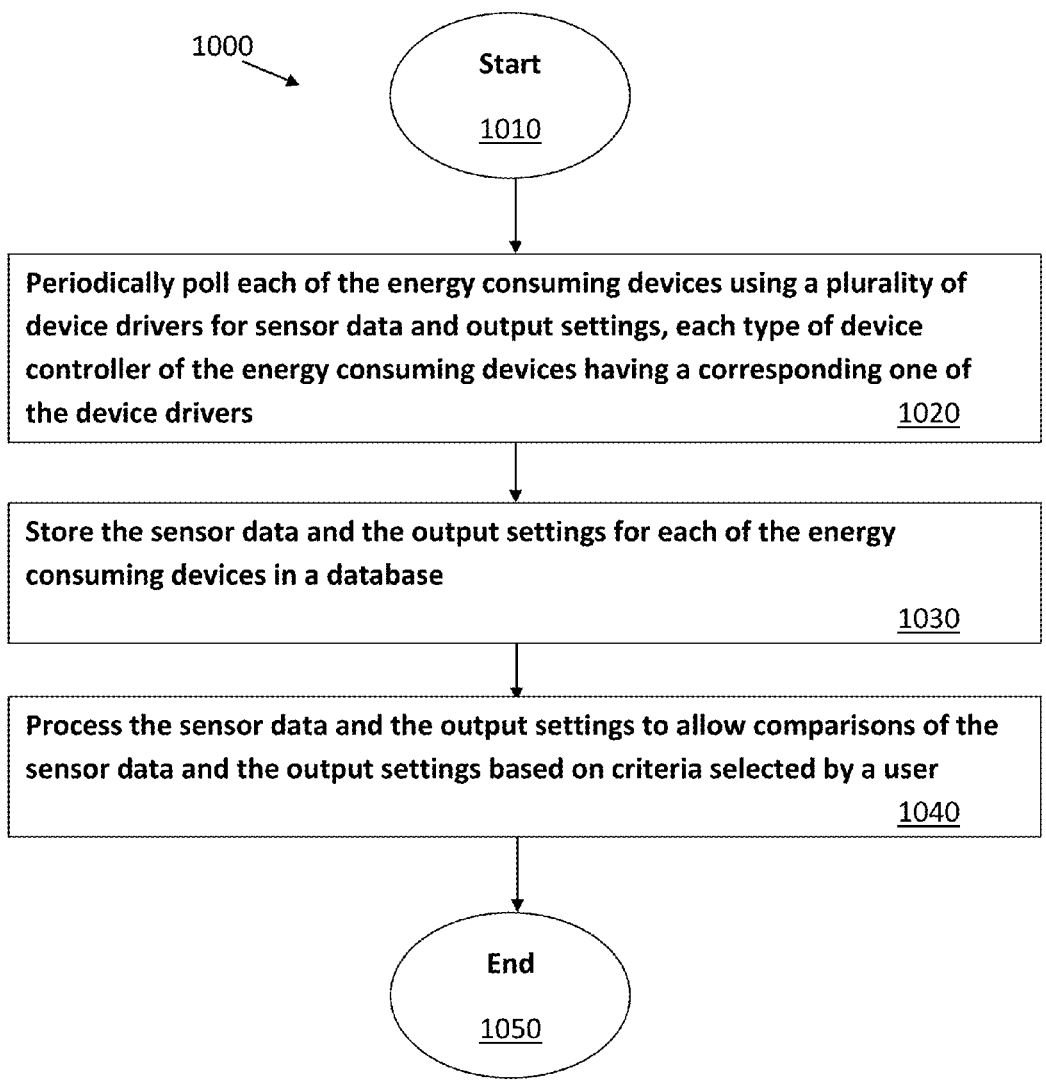
FIG. 10 is a flow chart illustrating an exemplary method.

FIG. 10 illustrates method 1000 according to the present technology. Method 1000 starts in start oval 1010 and proceeds to operation 1020, which indicates to periodically poll each of the energy consuming devices using a plurality of device drivers for sensor data and output settings. Each type of device controller of the energy consuming devices may have a corresponding device driver. Operation 1020 may also optionally indicate to tag received data with identifiers or timestamps as necessary. From operation 1020, the flow proceeds to operation 1030, which indicates to store the sensor data and the output settings for each of the energy consuming devices in a database. From operation 1030, the flow proceeds to operation 1040, which indicates to process the sensor data and the output settings to allow comparisons of the sensor data and the output settings based on criteria selected by a user. Operation 1040 may also optionally indicate to perform analytics and return the processed query to a display device. From operation 1040, the flow in method 1000 proceeds to end oval 1050.

The present technology also relates to systems and methods for multi-site device sensor data and energy consumption analytics. Systems and methods for analyzing multi-site energy consumption devices are provided. In a system according to one embodiment, a display layer is coupled in two-way communication with a database layer. The database layer is coupled in two-way communication with a device layer. The device layer includes one or more field devices. The database layer includes an aggregator module which continuously requests and receives digital packet information from the device layer. The digital packet information may include a device identifier, device energy consumption, sensor data and/or a timestamp. A storage module stores and organizes the digital packet information into a database. A query module is adapted to receive a query relating to the sensor data or energy consumption of field devices in the device layer and a log module stores received queries in the database. An analysis engine processes a received query using the received digital packet information to provide energy consumption and sensor data analytic capabilities. A display module returns the processed query to a display device in the device layer.

The present technology is directed to energy management and may provide multi-site device energy consumption and sensor data analytics. Analytics may include comparing sensor data or energy consumption of multiple devices, displaying sensor data or energy consumption of a device over time, and reporting sensor data or energy consumption of a field device that is below a set threshold parameter. Other analytics may compare groups of similar field devices, groups of field devices operating in a single location, groups of field devices operating in a similar temperature region, or any other possible grouping, including customized grouping. While the above-described analytics have been provided for explicating types of analytics that may be performed in the present technology, one of ordinary skill in the art would recognize that many other analytics may be performed with the present disclosure.

In some embodiments of the invention, the device layer may include multiple field devices. For example, the device layer may include two high volume air conditioners and/or three pumps. Additionally, a device layer may include systems which comprise multiple devices. For example, a meter may have a device for reading voltage Phase A, a device for reading voltage Phase B, and a device for reading voltage Phase C. Therefore a meter may comprise three field devices but may be treated as a single device.

In one embodiment, the database layer's aggregator module may continuously request and receive information from each of the field devices or systems in the device layer. In other embodiments, the aggregator may only receive information from field devices, because the field device is not adapted to receive requests. In one embodiment, the information may include a combination of a unique device identifier, energy consumption of the device, sensor data and/or a timestamp. For example, a pump may return information that it is identified as "Pump A" and has a power reading of 20 kWh at 2:00 PM, Feb. 14, 2012. In other embodiments, the information may only be the energy consumption or sensor data of the device, in which case the aggregator module in the database layer may be adapted to assign the sensor data or energy consumption information with a timestamp and/or a unique field device identifier as needed. A storage module continuously stores and organizes the information received in tables or a series of tables in a database.

Figure 11A:
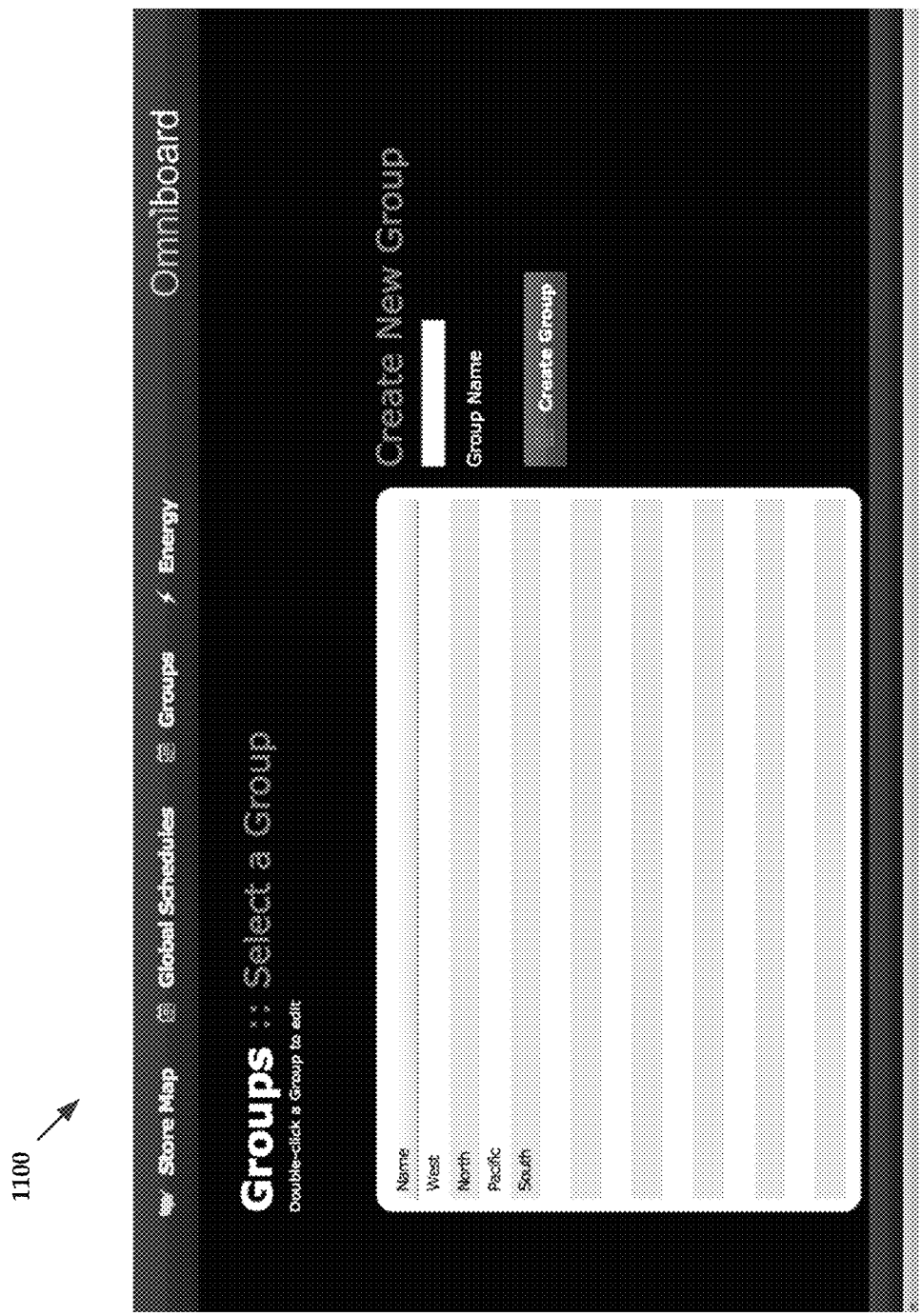
FIGS. 11A-11H are screenshots of an exemplary graphical user interface according to an exemplary embodiment.

In other embodiments, the database layer may also include a grouping module. The grouping module may be adapted to receive device relationship information. For example, the grouping module may receive information that Pump A, Pump B, and Pump C are pumps in the northeast region and Pump D and Pump E are in the southwest region. In another example, a California company's stores in San Francisco County may be grouped together separate from other California stores with the grouping module. FIG. 11A is a screenshot of exemplary graphical user interface 1100 for managing any number of energy consuming devices. FIG. 11A shows how a grouping module may receive relationship information. The grouping module may then store field device relationship information in the database.

A query module may be adapted to receive a sensor data or energy consumption query specific to a certain group of devices. For example, the query module may receive a query asking for the energy consumption of high-volume air conditioners in all stores across the United States. Additionally, a query may ask only for energy consumption of high-volume air conditioners in stores located in Texas. A query could also ask for temperature readings from thermostats in stores or it may ask for all temperature readings of a particular store over a twenty-four hour period. A query could ask for an alert when a store is consuming energy beyond a set parameter. In other embodiments, a query module may be adapted to receive multiple queries from different locations. According to this embodiment, multiple queries may be analyzed against the database. In some embodiments, a log module may be adapted to save queries in the database.

A database layer's analysis engine may process a received query using the device information and the relationship information. The analysis engine may locate the relevant information based on the unique field device identifiers and/or the stored relationship information. The display module may deliver the processed query to the display layer. For example, the display module may deliver the processed query in charts, graphs, or over maps. In another embodiment, the display module may deliver an alert or notification when sensor data or energy consumption exceeds or dips below set threshold parameters. In some embodiments, the display layer may include more than one display device. For example, the display module may deliver the processed query to a computer display and a smartphone display in the display layer. Additionally, the display module may deliver one processed query to a computer and a second processed query to a second computer at a different location.

Figure 11B:
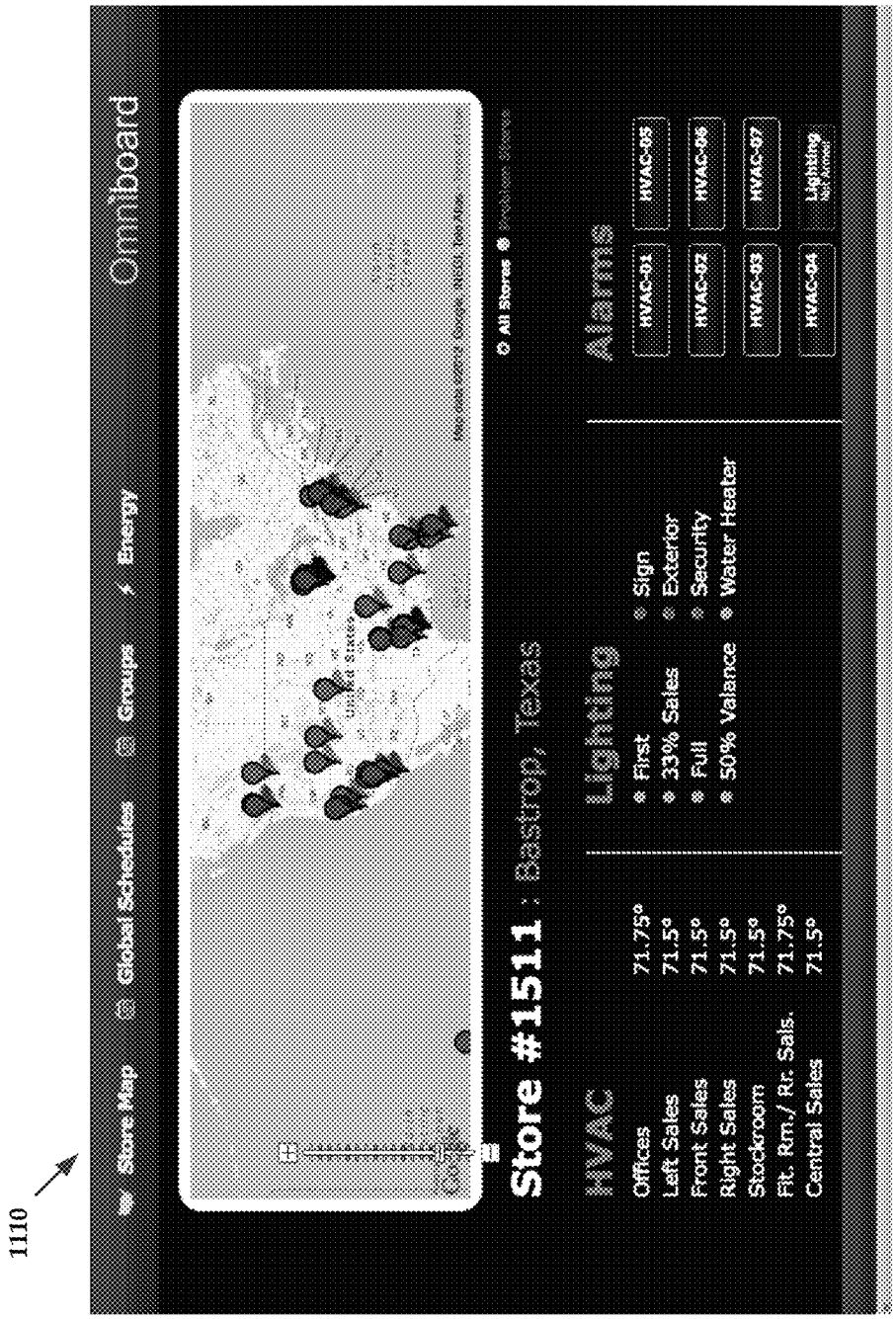
Figure 11C:
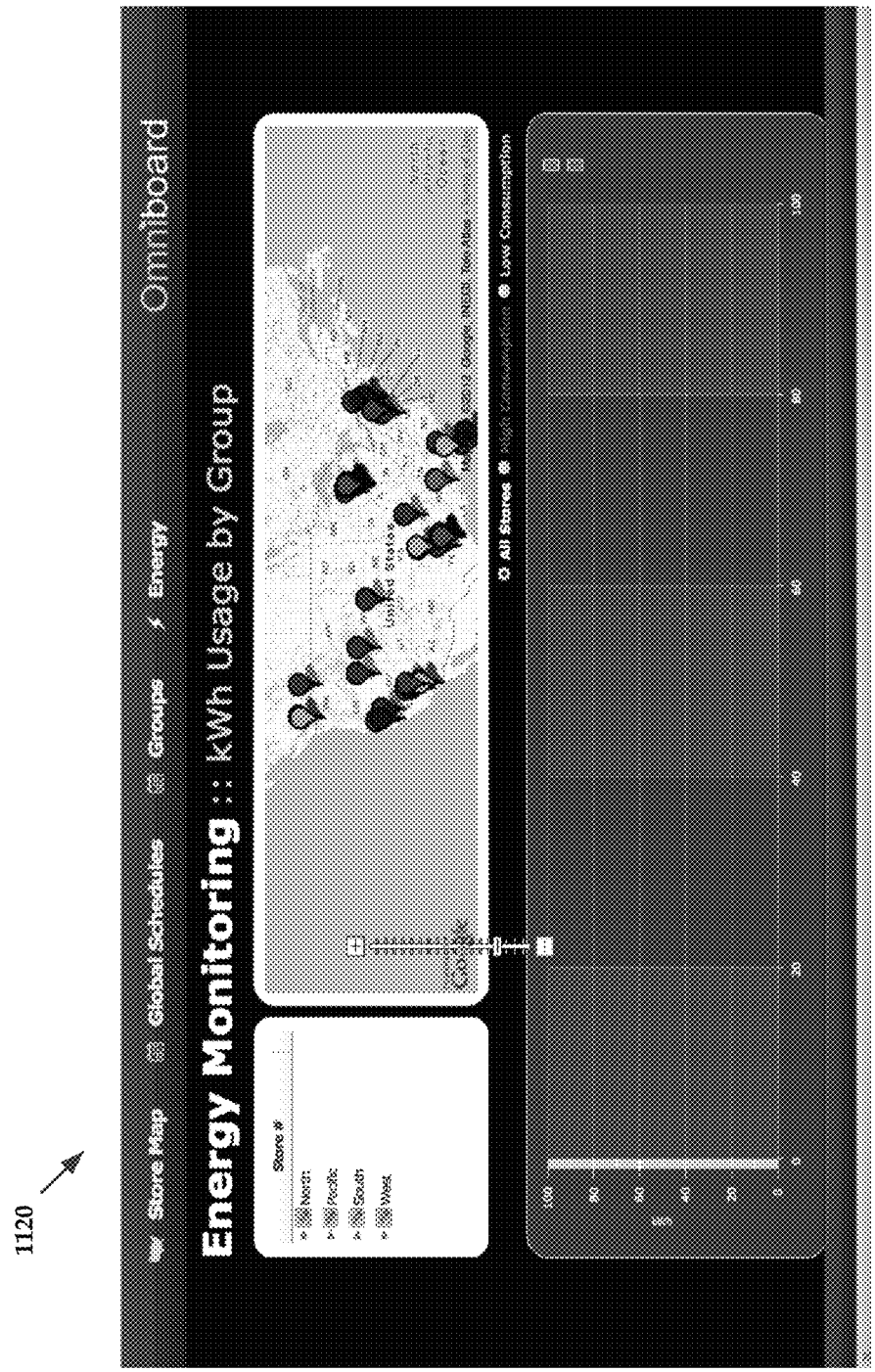

Examples of analytics and processed queries are provided in FIGS. 11B-11H. FIG. 11B is a screenshot of exemplary graphical user interface 1110 for managing any number of energy consuming devices. FIG. 11B shows sensor data from multiple field devices at Store #1511. Additionally, FIG. 11B shows how alerts may be generated for a field device if certain parameters cross a set threshold. FIG. 11C is a screenshot of exemplary graphical user interface 1120 for managing any number of energy consuming devices. FIG. 11C is an example of how stores may be grouped by region. Additionally, FIG. 11C shows how alerts may be generated visually on a map. In FIG. 11C, red store locations are high energy consumption stores, blue store locations are low energy consumption stores, and green store locations are average energy consumption stores.

Figure 11D:
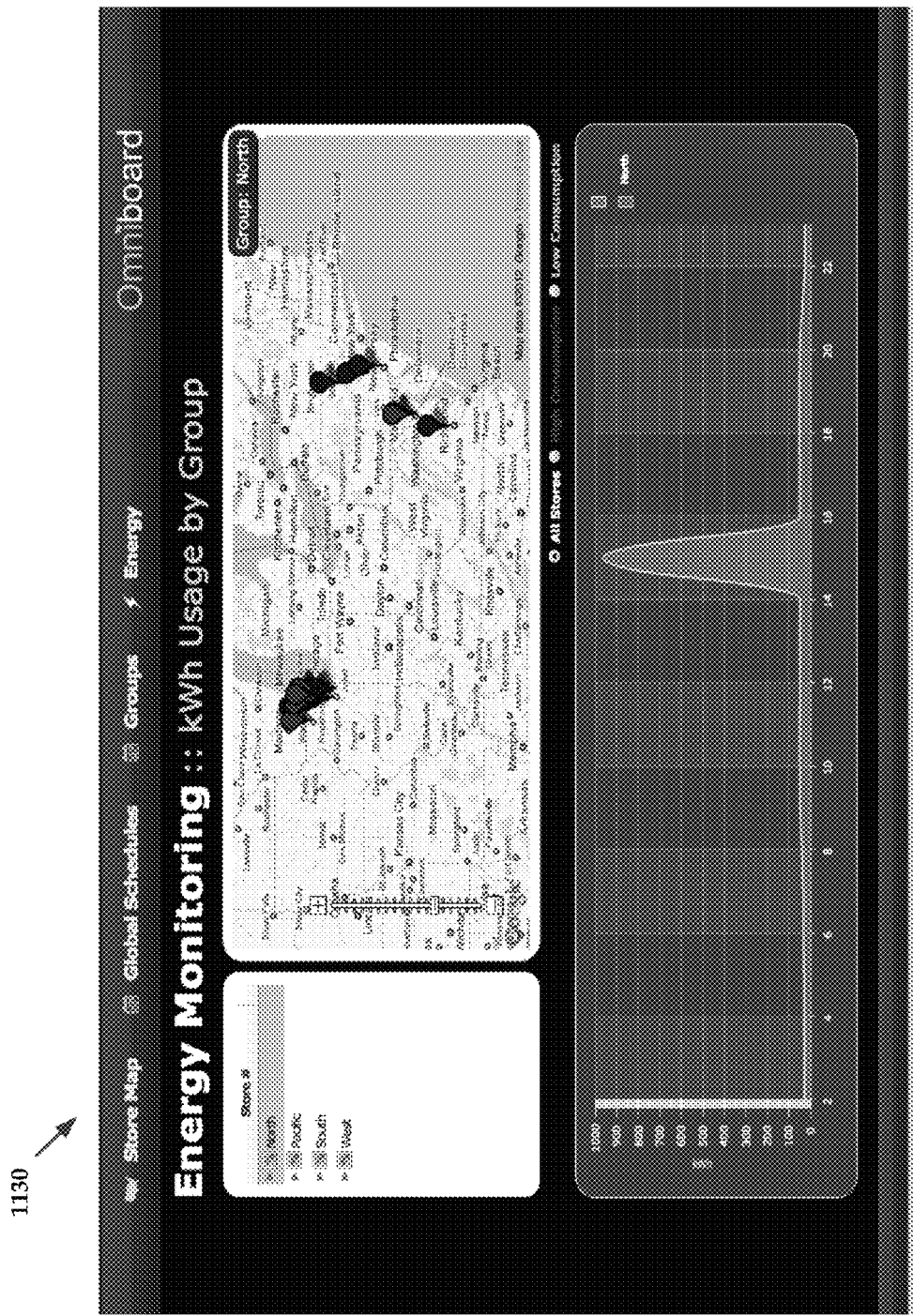
Figure 11E:
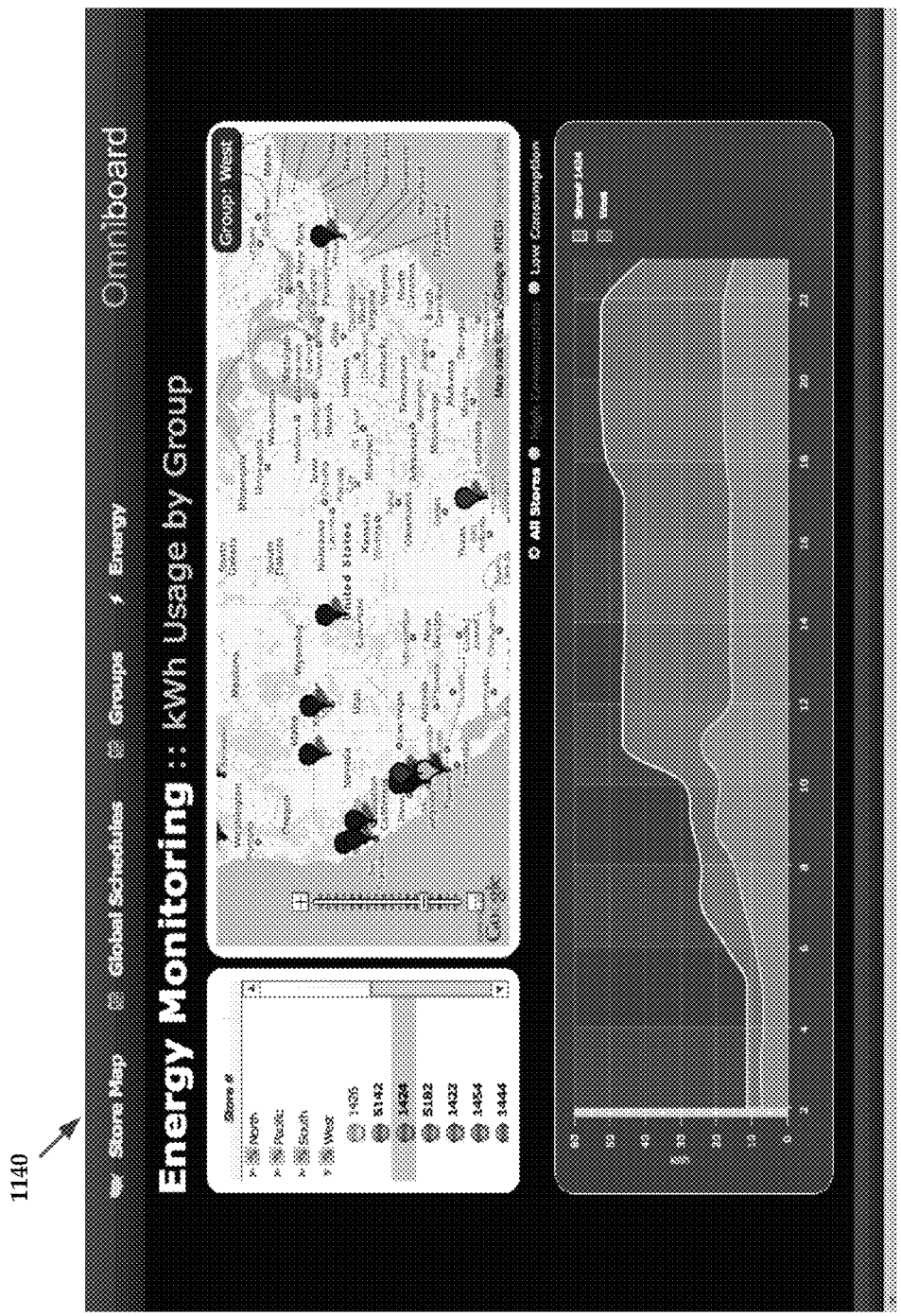
Figure 11F:
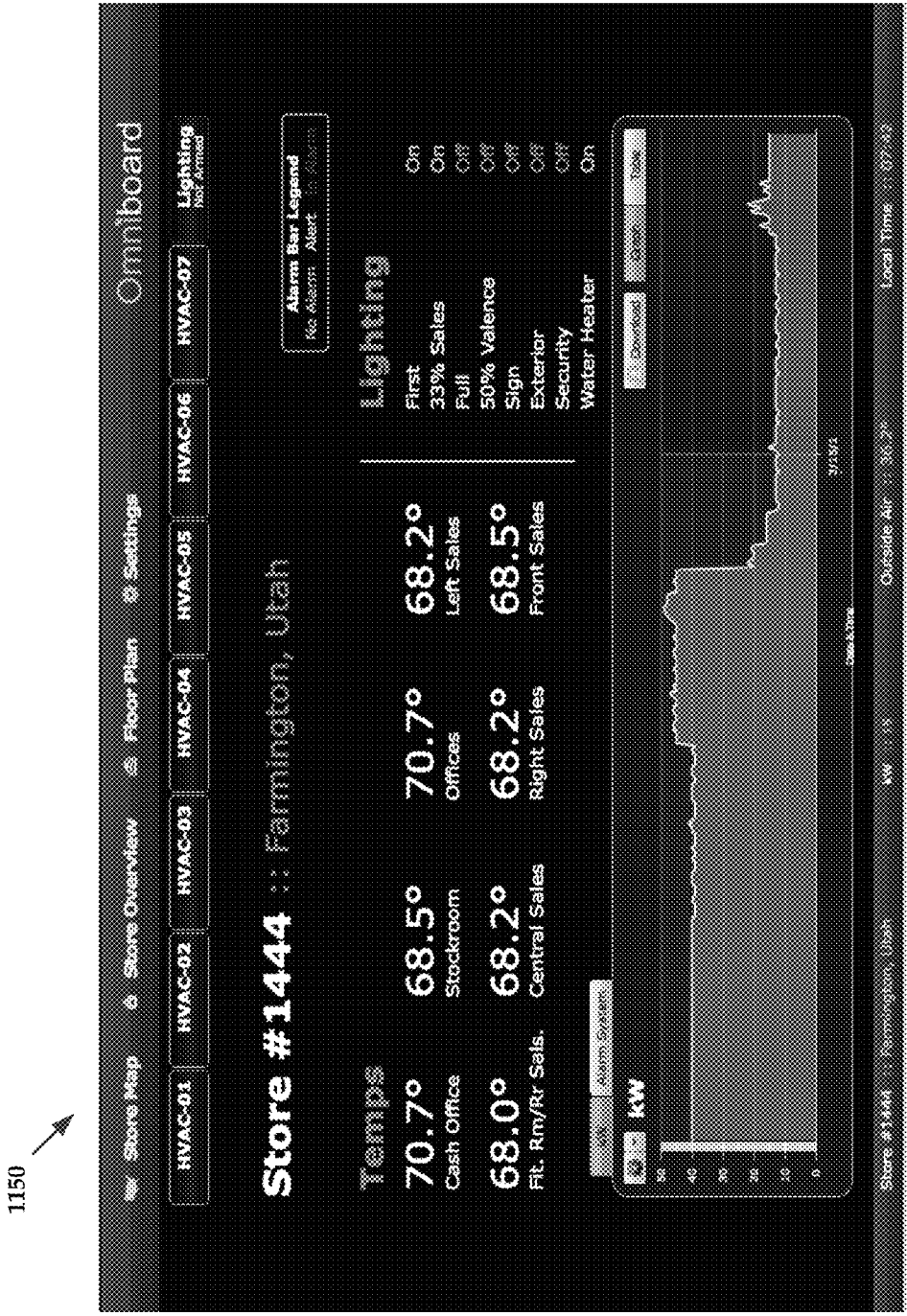
Figure 11G:
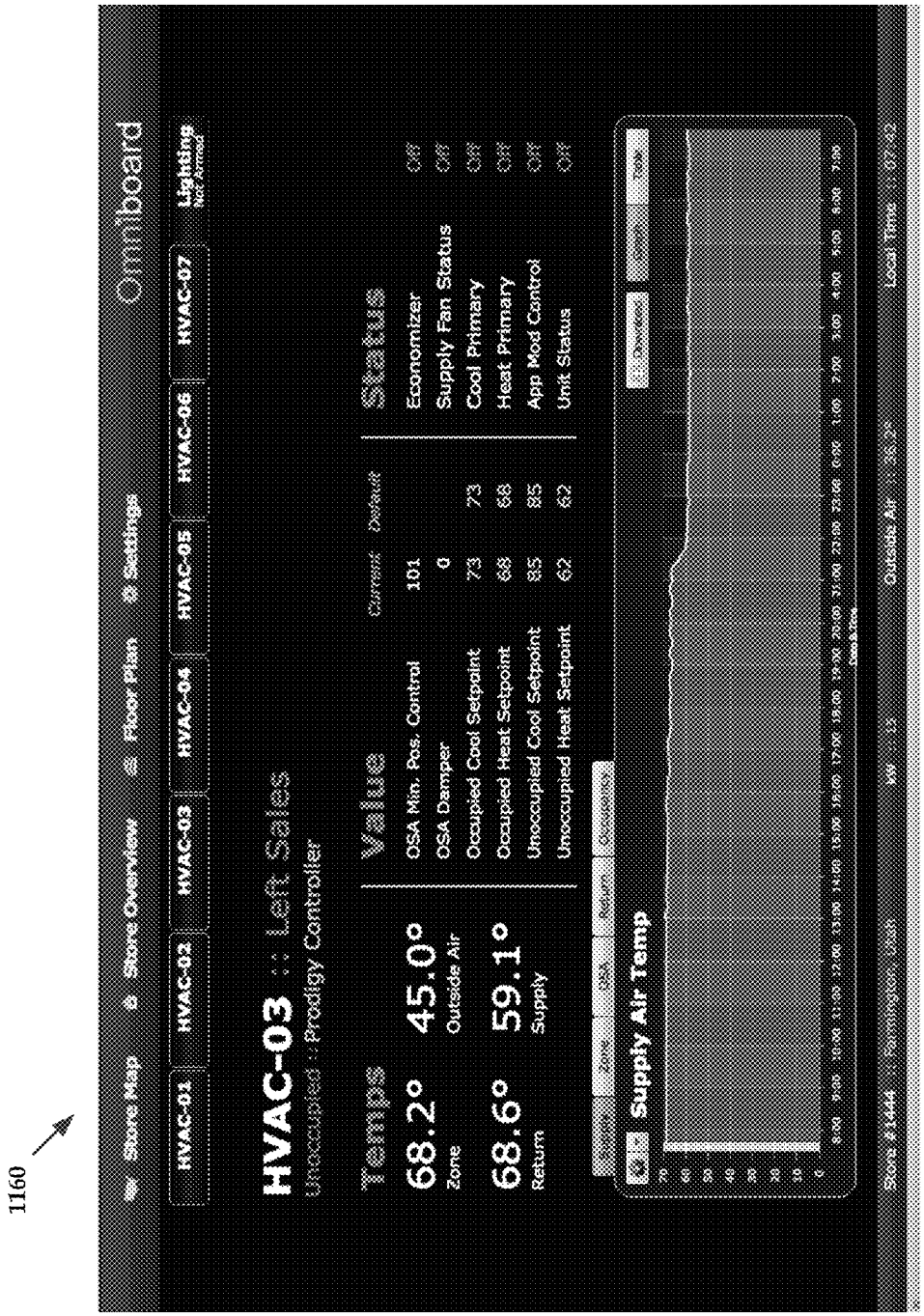
Figure 11H:
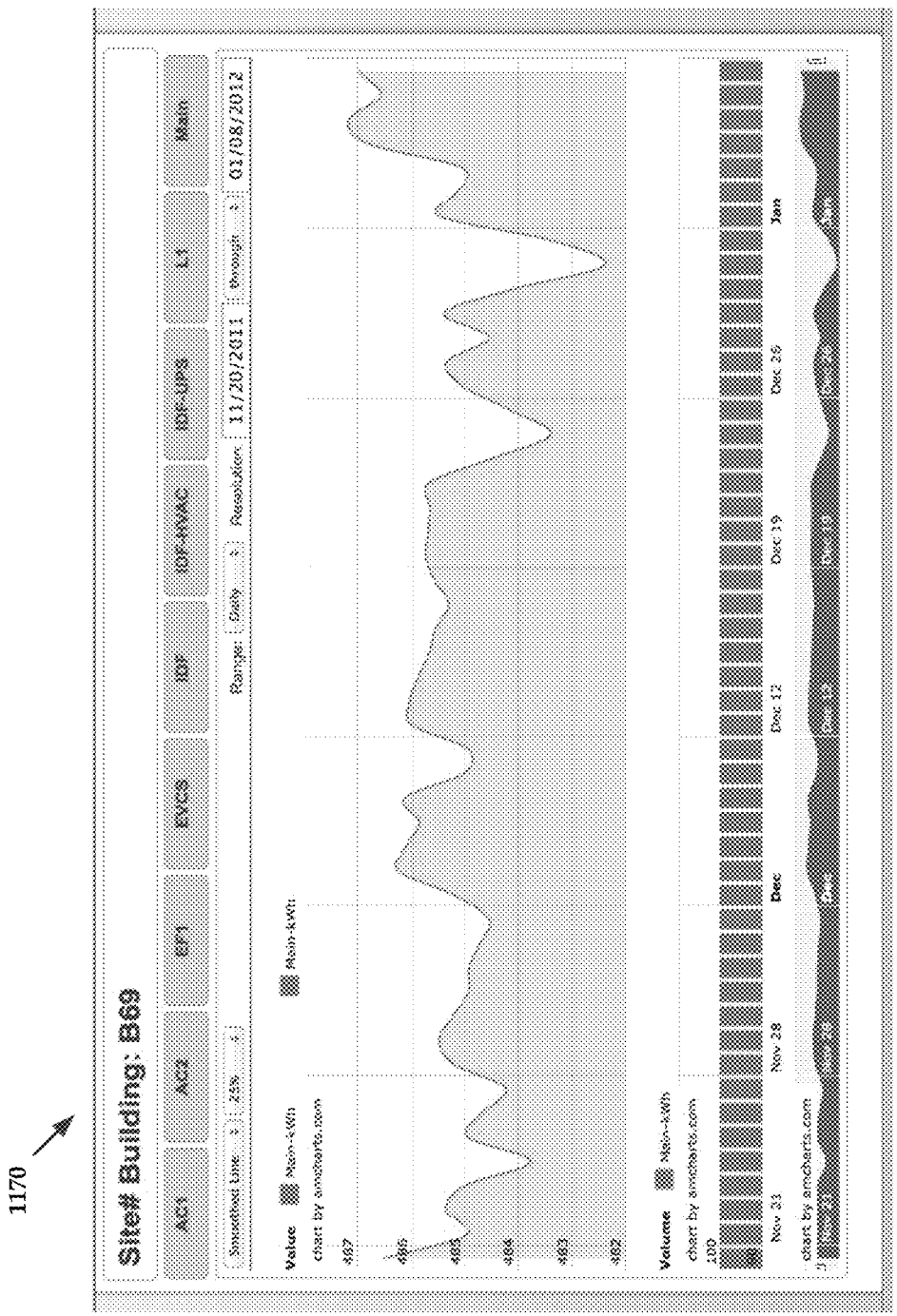

FIG. 11D is a screenshot of exemplary graphical user interface 1130 for managing any number of energy consuming devices. FIG. 11D shows how specific regions may be selected for analytics. The energy consumption in FIG. 11D is displayed on a graph with kWh over the course of time. FIG. 11E is a screenshot of exemplary graphical user interface 1140 for managing any number of energy consuming devices. FIG. 11E shows analytics comparing energy consumption of one store, Store #1424 with the average energy consumption of other stores in the "West" group. FIG. 11F is a screenshot of exemplary graphical user interface 1150 for managing any number of energy consuming devices. FIG. 11F shows energy consumption and sensor data of various devices at Store #1444. FIG. 11G is a screenshot of exemplary graphical user interface 1160 for managing any number of energy consuming devices. FIG. 11G shows how various sensor data may be delivered from various field devices and how the display of the data may be in graph form or table form. FIG. 11H is a screenshot of exemplary graphical user interface 1170 for managing any number of energy consuming devices. FIG. 11H shows energy consumption of a building over a several days.

A system for multi-site sensor data and energy consumption analytics is provided. The system includes a memory for storing executable instructions and a processor for executing the instructions stored in memory. The system also includes an aggregator module stored in memory and executable by the processor to request and receive information from a field device. The information is in digital packet form and includes a unique device identifier, device sensor data, device energy consumption, and a timestamp. The system further includes a storage module stored in memory and executable by the processor to store and organize the information in a database. The system includes a grouping module stored in memory and executable by the processor to receive and store field device relationship information in the database, and a query module stored in memory and executable by the processor to receive a query. The system also includes a log module stored in memory and executable by the processor to store the query in the database, and an analysis engine stored in memory and executable by the processor to process the query utilizing the stored information and the field device relationship information. The system also includes a display module stored in memory and executable by the processor to deliver the processed query to a display device.

The above description is illustrative and not restrictive. Many variations of the invention will become apparent to those of skill in the art upon review of this disclosure. The scope of the invention should, therefore, be determined not with reference to the above description, but instead should be determined with reference to the appended claims along with their full scope of equivalents.

What is claimed is:

1. A system for operating a plurality of energy consuming devices, comprising:
    a database storing at least one device driver, the at least one device driver operating at least one device controller, at least one of the device drivers comprising a database layer interface and a device layer interface;
    a network interface coupling the database with a network, the network coupled to the at least one device controller, the database transmitting the device layer interface over the network to the at least one device controller, the at least one device controller controlling a first energy consuming device of the plurality of energy consuming devices; and
    a second database storing at least one second device driver, the at least one second device driver operating the at least one device controller, at least one of the second device drivers comprising a second database layer interface and a second device layer interface;
    wherein the network interface couples the second database with the network, the second database transmitting the second device layer interface over the network to the at least one device controller when at least one of the databases fails and the at least one device driver fails.

2. The system of claim 1, wherein the database provides a mechanism to perform at least one of modifying, updating and disabling the at least one device driver stored in the database.

3. The system of claim 2, wherein the database transmits the device layer interface over the network to the at least one device controller at least one of periodically and after a client at least one of modifies, updates and disables the at least one device driver stored in the database.

4. The system of claim 1, wherein the database further stores data associated with the plurality of energy consuming devices.

5. The system of claim 4, wherein the database does not permit a client to modify the data stored in the database.

6. The system of claim 1, wherein:
    the at least one device driver operates a plurality of device controllers;
    the at least one device controller comprises a plurality of device controllers; and
    the database transmits the device layer interface over the network to a further device controller of the plurality of device controllers, the further device controller controlling a second energy consuming device of the plurality of energy consuming devices.

7. The system of claim 1, further comprising
    wherein the network interface couples the second database with the network, the second database transmitting the second device layer interface over the network to the at least one second device controller, the at least one second device controller controlling a second energy consuming device of the plurality of energy consuming devices.

8. The system of claim 1, wherein the database enables a licensor of the at least one device driver to disable the at least one device driver stored in the database and cause the database to transmit a disabled version of the device layer interface over the network to the at least one device controller.

9. The system of claim 1, wherein the at least one device driver is stored in the database in a virtual file system.

10. A method for operating a plurality of energy consuming devices, comprising:
    storing in a database at least one device driver, the at least one device driver operating at least one device controller, at least one of the device drivers comprising a database layer interface and a device layer interface;
    coupling the database to a network, the network coupled to the at least one device controller, the database transmitting the device layer interface over the network to the at least one device controller, the at least one device controller controlling a first energy consuming device of the plurality of energy consuming devices;

storing in a second database at least one second device driver, the at least one second device driver operating the at least one device controller, at least one of the second device drivers comprising a second database layer interface and a second device layer interface; and coupling the second database to the network, the second database transmitting the second device layer interface over the network to the at least one device controller when at least one of the databases fails and the at least one device driver fails.

11. The method of claim 10, further comprising enabling a client to at least one of modify, update and disable the at least one device driver stored in the database.

12. The method of claim 11, further comprising transmitting the device layer interface over the network to the at least one device controller at least one of periodically and after the client at least one of modifies, updates and disables the at least one device driver stored in the database.

13. The method of claim 10, further comprising further storing in the database data associated with the plurality of energy consuming devices.

14. The method of claim 13, further comprising not permitting a client to modify the data stored in the database.

15. The method of claim 10, wherein:
the at least one device driver is operating a plurality of device controllers; and
the at least one device controller is a plurality of device controllers; and
the method further comprises transmitting, by the database, the device layer interface over the network to a further device controller of the plurality of device controllers, the further device controller controlling a second energy consuming device of the plurality of energy consuming devices.

16. The method of claim 10, further comprising
coupling the second database to the network, the second database transmitting the second device layer interface over the network to the at least one second device controller, the at least one second device controller controlling a second energy consuming device of the plurality of energy consuming devices.

17. The method of claim 10, further comprising enabling a licensor of the at least one device driver to disable the at least one device driver stored in the database and cause the database to transmit a disabled version of the device layer interface over the network to the at least one device controller.

18. A non-transitory computer readable medium having recorded thereon a program, the program when executed causing a computer to perform a method, the method analyzing data from a plurality of energy consuming devices, the method comprising:

storing in a database at least one device driver, the at least one device driver operating at least one device controller, at least one of the device drivers comprising a database layer interface and a device layer interface;

coupling the database to a network, the network coupled to the at least one device controller, the database transmitting the device layer interface over the network to the at least one device controller, the at least one device controller controlling a first energy consuming device of the plurality of energy consuming devices;

storing in a second database at least one second device driver, the at least one second device driver operating the at least one device controller, at least one of the second device drivers comprising a second database layer interface and a second device layer interface; and coupling the second database to the network, the second database transmitting the second device layer interface over the network to the at least one device controller when at least one of the databases fails and the at least one device driver fails.

* * * * *